United States Patent
Chuang et al.

(10) Patent No.: US 10,429,719 B2
(45) Date of Patent: *Oct. 1, 2019

(54) 183 NM CW LASER AND INSPECTION SYSTEM

(71) Applicant: KLA-Tencor Corporation, Milpitas, CA (US)

(72) Inventors: Yung-Ho Alex Chuang, Cupertino, CA (US); Xiaoxu Lu, San Jose, CA (US); Baigang Zhang, San Jose, CA (US); John Fielden, Los Altos, CA (US); Vladimir Dribinski, Livermore, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,032

(22) Filed: Nov. 29, 2018

(65) Prior Publication Data

US 2019/0107766 A1 Apr. 11, 2019

Related U.S. Application Data

(62) Division of application No. 15/806,953, filed on Nov. 8, 2017, now Pat. No. 10,175,555.

(Continued)

(51) Int. Cl.
*G02F 1/35* (2006.01)
*G02F 1/355* (2006.01)

(52) U.S. Cl.
CPC ............ *G02F 1/353* (2013.01); *G02F 1/3501* (2013.01); *G02F 1/3551* (2013.01);
(Continued)

(58) Field of Classification Search
CPC . G02F 1/3532; G02F 1/37; G02F 1/39; G02F 2001/354; H01S 3/0092; H01S 3/109; H01S 5/0092
See application file for complete search history.

(56) References Cited

U.S. PATENT DOCUMENTS

| 2,672,072 A | 3/1954 | Sachtleben et al. |
| 3,755,704 A | 8/1973 | Spindt et al. |

(Continued)

FOREIGN PATENT DOCUMENTS

| CN | 1288275 A | 3/2001 |
| CN | 101702490 A | 5/2010 |

(Continued)

OTHER PUBLICATIONS

Antonosyan et al, Phase-reversed structures in superlattice of nonlinear materials, http://arxiv.org/abs/1109.2751v1 (2011), 6 pages.

(Continued)

*Primary Examiner* — Daniel Petkovsek
(74) *Attorney, Agent, or Firm* — Bever, Hoffman & Harms, LLP

(57) ABSTRACT

An inspection system/method in which first optics direct continuous wave (CW) light at 181-185 nm to an inspected article, and second optics redirect image information affected by the article to detectors. A laser assembly generates the CW light by generating fourth harmonic light from first fundamental CW light having a first wavelength between 1 and 1.1 µm, generating fifth harmonic light by mixing the fourth harmonic light with the first fundamental CW light, and mixing the fifth harmonic light with second light having a second wavelength between 1.26 and 1.82 µm. An external cavity mixes the first light and the fourth harmonic light using a first nonlinear crystal. The CW light is generated using a second cavity that passes circulated second fundamental or signal CW light through a second (Continued)

nonlinear crystal, and directing the fifth harmonic light through the second nonlinear crystal.

20 Claims, 14 Drawing Sheets

Related U.S. Application Data

(60) Provisional application No. 62/441,875, filed on Jan. 3, 2017.

(52) U.S. Cl.
CPC .... *G02F 1/3558* (2013.01); *G02F 2001/3503* (2013.01); *G02F 2001/354* (2013.01); *G02F 2201/16* (2013.01)

(56) References Cited

U.S. PATENT DOCUMENTS

| | | |
|---|---|---|
| 4,178,561 A | 12/1979 | Bruesselbach et al. |
| 4,467,189 A | 8/1984 | Tsuchiya |
| 4,644,221 A | 2/1987 | Gutierrez et al. |
| 4,853,595 A | 8/1989 | Alfano et al. |
| 5,120,949 A | 6/1992 | Tomasetti |
| 5,144,630 A | 9/1992 | Lin |
| 5,339,324 A | 8/1994 | Eguchi et al. |
| 5,367,531 A | 11/1994 | Eguchi et al. |
| 5,418,810 A | 5/1995 | Eguchi et al. |
| 5,563,702 A | 10/1996 | Emery et al. |
| 5,572,598 A | 11/1996 | Wihl et al. |
| 5,625,633 A | 4/1997 | Ichimura et al. |
| 5,742,626 A | 4/1998 | Mead et al. |
| 5,760,809 A | 6/1998 | Malhotra et al. |
| 5,760,899 A | 6/1998 | Eismann |
| 5,825,562 A | 10/1998 | Lai et al. |
| 5,936,761 A | 8/1999 | Kubota et al. |
| 5,943,353 A | 8/1999 | Kaneko |
| 5,999,310 A | 12/1999 | Shafer et al. |
| 6,005,878 A | 12/1999 | Kung et al. |
| 6,018,413 A | 1/2000 | Oka |
| 6,064,759 A | 5/2000 | Buckley et al. |
| 6,181,461 B1 | 1/2001 | Wada et al. |
| 6,201,257 B1 | 3/2001 | Stettner et al. |
| 6,201,601 B1 | 3/2001 | Vaez-Iravani et al. |
| 6,212,310 B1 | 4/2001 | Waarts et al. |
| 6,220,914 B1 | 4/2001 | Lee et al. |
| 6,249,371 B1 | 6/2001 | Masuda et al. |
| 6,271,916 B1 | 8/2001 | Marxer et al. |
| 6,285,018 B1 | 9/2001 | Aebi et al. |
| 6,285,691 B1 | 9/2001 | Kaneda et al. |
| 6,327,281 B1 | 12/2001 | Yin |
| 6,347,102 B1 | 2/2002 | Konno et al. |
| 6,373,869 B1 | 4/2002 | Jacob |
| 6,498,801 B1 | 12/2002 | Dudelzak et al. |
| 6,535,531 B1 | 3/2003 | Smith et al. |
| 6,590,698 B1 | 7/2003 | Ohtsuki et al. |
| 6,608,676 B1 | 8/2003 | Zhao et al. |
| 6,633,594 B1 | 10/2003 | Kiriyama et al. |
| 6,714,567 B2 | 3/2004 | Masuda |
| 6,791,099 B2 * | 9/2004 | Some ................ G01N 21/9501 250/559.4 |
| 6,816,520 B1 | 11/2004 | Tulloch et al. |
| 6,859,335 B1 | 2/2005 | Lai et al. |
| 6,862,131 B2 | 3/2005 | Masuda |
| 6,888,855 B1 | 5/2005 | Kopf |
| 7,027,209 B2 | 4/2006 | Zanger et al. |
| 7,098,992 B2 | 8/2006 | Ohtsuki et al. |
| 7,136,402 B1 | 11/2006 | Ohtsuki |
| 7,304,310 B1 | 12/2007 | Shortt et al. |
| 7,313,155 B1 | 12/2007 | Mu et al. |
| 7,321,468 B2 | 1/2008 | Herkommer et al. |
| 7,339,961 B2 | 3/2008 | Tokuhisa et al. |
| 7,345,825 B2 | 3/2008 | Chuang et al. |
| 7,352,457 B2 | 4/2008 | Kvamme et al. |
| 7,432,517 B2 | 10/2008 | Botma et al. |
| 7,463,657 B2 | 12/2008 | Spinelli et al. |
| 7,471,705 B2 | 12/2008 | Gerstenberger et al. |
| 7,525,649 B1 | 4/2009 | Leong et al. |
| 7,528,943 B2 | 5/2009 | Brown et al. |
| 7,586,108 B2 | 9/2009 | Nihtianov et al. |
| 7,593,437 B2 | 9/2009 | Staroudoumov |
| 7,593,440 B2 | 9/2009 | Spinelli et al. |
| 7,609,309 B2 | 10/2009 | Brown et al. |
| 7,623,557 B2 | 11/2009 | Tokuhisa et al. |
| 7,627,007 B1 | 12/2009 | Armstrong et al. |
| 7,643,529 B2 | 1/2010 | Brown et al. |
| 7,715,459 B2 | 5/2010 | Brown et al. |
| 7,773,643 B2 | 8/2010 | Masuda |
| 7,813,406 B1 | 10/2010 | Nguyen et al. |
| 7,822,092 B2 | 10/2010 | Ershov et al. |
| 7,875,948 B2 | 1/2011 | Hynecek et al. |
| 7,920,607 B2 | 4/2011 | Furutachi et al. |
| 7,920,616 B2 | 4/2011 | Brown et al. |
| 7,952,633 B2 | 5/2011 | Brown et al. |
| 7,999,342 B2 | 8/2011 | Hsu et al. |
| 8,208,505 B2 | 6/2012 | Dantus et al. |
| 8,238,647 B2 | 8/2012 | Ben-Yishay et al. |
| 8,298,335 B2 | 10/2012 | Armstrong |
| 8,309,443 B2 | 11/2012 | Tanaka et al. |
| 8,319,960 B2 | 11/2012 | Aiko et al. |
| 8,323,406 B2 | 12/2012 | Bondokov et al. |
| 8,391,660 B2 | 3/2013 | Islam |
| 8,422,119 B1 | 4/2013 | Keaton et al. |
| 8,432,944 B2 | 4/2013 | Romanovsky et al. |
| 8,503,068 B2 | 8/2013 | Sakuma |
| 8,514,587 B2 | 8/2013 | Zhang et al. |
| 8,629,384 B1 | 1/2014 | Biellak et al. |
| 8,665,536 B2 | 3/2014 | Armstrong |
| 8,686,331 B2 | 4/2014 | Armstrong |
| 8,711,460 B2 | 4/2014 | Ueda et al. |
| 8,755,417 B1 | 6/2014 | Dribinski |
| 8,873,596 B2 | 10/2014 | Dribinski et al. |
| 8,891,079 B2 | 11/2014 | Zhao et al. |
| 8,896,917 B2 | 11/2014 | Armstrong |
| 8,929,406 B2 | 1/2015 | Chuang et al. |
| 8,976,343 B2 | 3/2015 | Genis |
| 9,151,940 B2 | 10/2015 | Chuang et al. |
| 9,293,882 B2 | 3/2016 | Chuang |
| 9,318,869 B2 | 4/2016 | Chuang et al. |
| 9,426,400 B2 | 8/2016 | Brown et al. |
| 9,461,435 B2 | 10/2016 | Dribinski et al. |
| 9,478,402 B2 | 10/2016 | Chuang et al. |
| 9,496,425 B2 | 11/2016 | Chern et al. |
| 9,509,112 B2 | 11/2016 | Chuang et al. |
| 9,525,265 B2 | 12/2016 | Chuang et al. |
| 9,529,182 B2 | 12/2016 | Chuang et al. |
| 9,601,299 B2 | 3/2017 | Chuang et al. |
| 9,608,399 B2 | 3/2017 | Chuang et al. |
| 9,748,294 B2 | 8/2017 | Muramatsu et al. |
| 9,748,729 B2 * | 8/2017 | Chuang .............. G01N 21/9501 |
| 10,175,555 B2 * | 1/2019 | Chuang .................. G02F 1/353 |
| 2001/0000977 A1 | 5/2001 | Vaez-Iravani et al. |
| 2002/0101900 A1 | 8/2002 | Govorkov et al. |
| 2002/0114553 A1 | 8/2002 | Mead et al. |
| 2002/0148942 A1 | 10/2002 | Payne et al. |
| 2002/0191834 A1 | 12/2002 | Fishbaine |
| 2003/0012233 A1 | 1/2003 | Kobayashi et al. |
| 2003/0043876 A1 | 3/2003 | Lublin et al. |
| 2003/0147128 A1 | 8/2003 | Shafer et al. |
| 2003/0161374 A1 | 8/2003 | Lokai |
| 2004/0080741 A1 | 4/2004 | Marxer et al. |
| 2005/0041702 A1 | 2/2005 | Fermann et al. |
| 2005/0110988 A1 | 5/2005 | Nishiyama et al. |
| 2005/0111081 A1 | 5/2005 | Shafer et al. |
| 2005/0122021 A1 | 6/2005 | Smith et al. |
| 2005/0128473 A1 | 6/2005 | Karpol et al. |
| 2005/0157382 A1 | 7/2005 | Kafka et al. |
| 2005/0169326 A1 | 8/2005 | Jacob et al. |
| 2005/0190452 A1 | 9/2005 | Govorkov et al. |
| 2005/0254049 A1 | 11/2005 | Zhao et al. |
| 2005/0254065 A1 | 11/2005 | Stokowski |
| 2006/0038984 A9 | 2/2006 | Vaez-Iravani et al. |
| 2006/0039423 A1 | 2/2006 | Tokuhisa et al. |

(56) References Cited

U.S. PATENT DOCUMENTS

| | | |
|---|---|---|
| 2006/0165136 A1 | 7/2006 | Johansson et al. |
| 2006/0171656 A1 | 8/2006 | Adachi et al. |
| 2006/0176916 A1 | 8/2006 | Zanger et al. |
| 2006/0239535 A1 | 10/2006 | Takada et al. |
| 2006/0291862 A1 | 12/2006 | Kawai |
| 2007/0002465 A1 | 1/2007 | Chuang et al. |
| 2007/0047600 A1 | 3/2007 | Luo et al. |
| 2007/0096648 A1 | 5/2007 | Nakajima et al. |
| 2007/0103769 A1 | 5/2007 | Kuwabara |
| 2007/0146693 A1 | 6/2007 | Brown et al. |
| 2007/0188744 A1 | 8/2007 | Leslie et al. |
| 2007/0211773 A1 | 9/2007 | Gerstenberger et al. |
| 2007/0263680 A1 | 11/2007 | Starodoumov et al. |
| 2007/0291810 A1 | 12/2007 | Luo et al. |
| 2008/0055702 A1 | 3/2008 | Ferrari |
| 2008/0173903 A1 | 7/2008 | Imai et al. |
| 2008/0186476 A1 | 8/2008 | Kusunose |
| 2008/0204737 A1 | 8/2008 | Ogawa et al. |
| 2008/0225904 A1 | 9/2008 | Brown et al. |
| 2008/0240177 A1 | 10/2008 | Karlsson et al. |
| 2009/0084989 A1 | 4/2009 | Imai |
| 2009/0108207 A1 | 4/2009 | Liu |
| 2009/0128912 A1 | 5/2009 | Okada et al. |
| 2009/0180176 A1 | 7/2009 | Armstrong et al. |
| 2009/0185583 A1 | 7/2009 | Kuksenkov et al. |
| 2009/0185588 A1 | 7/2009 | Munroe |
| 2009/0296755 A1 | 12/2009 | Brown et al. |
| 2010/0103409 A1 | 4/2010 | Ohshima et al. |
| 2010/0188655 A1 | 7/2010 | Brown et al. |
| 2010/0301437 A1 | 12/2010 | Brown |
| 2011/0013653 A1 | 1/2011 | Krausz et al. |
| 2011/0026548 A1 | 2/2011 | Tamaya et al. |
| 2011/0062127 A1 | 3/2011 | Gu et al. |
| 2011/0073982 A1 | 3/2011 | Armstrong et al. |
| 2011/0085149 A1 | 4/2011 | Nathan |
| 2011/0101219 A1 | 5/2011 | Uchiyama et al. |
| 2011/0122896 A1 | 5/2011 | Mao |
| 2011/0134944 A1 | 6/2011 | Kaneda et al. |
| 2011/0220815 A1 | 9/2011 | Sakuma et al. |
| 2011/0222565 A1 | 9/2011 | Horain et al. |
| 2011/0228263 A1 | 9/2011 | Chuang et al. |
| 2011/0279819 A1 | 11/2011 | Chuang et al. |
| 2012/0026578 A1 | 2/2012 | Sakuma |
| 2012/0033291 A1 | 2/2012 | Kneip |
| 2012/0092657 A1 | 4/2012 | Shibata et al. |
| 2012/0113995 A1 | 5/2012 | Armstrong |
| 2012/0120481 A1 | 5/2012 | Armstrong |
| 2012/0137909 A1 | 6/2012 | Hawes et al. |
| 2012/0160993 A1 | 6/2012 | Nevet et al. |
| 2012/0292531 A1 | 11/2012 | Grudinin et al. |
| 2012/0314286 A1 | 12/2012 | Chuang et al. |
| 2013/0009069 A1 | 1/2013 | Okada |
| 2013/0016346 A1 | 1/2013 | Romanovsky et al. |
| 2013/0020491 A1 | 1/2013 | Mazzillo |
| 2013/0021602 A1 | 1/2013 | Dribinski et al. |
| 2013/0026578 A1 | 1/2013 | Tsau |
| 2013/0064259 A1 | 3/2013 | Wakabayashi et al. |
| 2013/0077086 A1 | 3/2013 | Chuang et al. |
| 2013/0082241 A1 | 4/2013 | Kub et al. |
| 2013/0088706 A1 | 4/2013 | Chuang et al. |
| 2013/0126705 A1 | 5/2013 | Maleev |
| 2013/0135711 A1 | 5/2013 | Alekel et al. |
| 2013/0169957 A1 | 7/2013 | Wolf et al. |
| 2013/0176552 A1 | 7/2013 | Brown et al. |
| 2013/0194445 A1 | 8/2013 | Brown et al. |
| 2013/0313440 A1 | 11/2013 | Chuang et al. |
| 2013/0336574 A1 | 12/2013 | Nasser-Ghodsi et al. |
| 2014/0016655 A1 | 1/2014 | Armstrong |
| 2014/0050234 A1 | 2/2014 | Ter-Mikirtychev |
| 2014/0071520 A1 | 3/2014 | Armstrong |
| 2014/0111799 A1 | 4/2014 | Lei et al. |
| 2014/0204963 A1 | 7/2014 | Chuang et al. |
| 2014/0305367 A1 | 10/2014 | Chuang et al. |
| 2015/0007765 A1 | 1/2015 | Dribinski |
| 2015/0177159 A1 | 6/2015 | Brown et al. |
| 2015/0268176 A1 | 9/2015 | Deng et al. |
| 2015/0275393 A1 | 10/2015 | Bondokov et al. |
| 2015/0294998 A1 | 10/2015 | Nihtianov et al. |
| 2016/0334652 A1 | 11/2016 | Sakuma |
| 2017/0323716 A1 | 11/2017 | Chuang et al. |

FOREIGN PATENT DOCUMENTS

| | | |
|---|---|---|
| CN | 102163793 A | 8/2011 |
| CN | 202167755 U | 3/2012 |
| DE | 102005015497 A1 | 10/2006 |
| DE | 102007004235 B3 | 1/2008 |
| EP | 0532927 A2 | 3/1993 |
| EP | 0602983 A1 | 6/1994 |
| EP | 0746871 A1 | 12/1996 |
| EP | 1194804 A2 | 4/2002 |
| EP | 1939917 A2 | 7/2008 |
| EP | 2013951 A2 | 1/2009 |
| JP | H0511287 A | 1/1993 |
| JP | H08241977 A | 9/1996 |
| JP | H11121854 A | 4/1999 |
| JP | 2000223408 A | 8/2000 |
| JP | 2002033473 | 1/2002 |
| JP | 2002258339 A | 9/2002 |
| JP | 2003043533 A | 2/2003 |
| JP | 2004086193 A | 3/2004 |
| JP | 2005150252 A | 6/2005 |
| JP | 2005275095 A | 10/2005 |
| JP | 2006060162 A | 3/2006 |
| JP | 2006343786 A | 12/2006 |
| JP | 2007086108 A | 4/2007 |
| JP | 2007206452 A | 8/2007 |
| JP | 2007249092 A | 9/2007 |
| JP | 2007298932 A | 11/2007 |
| JP | 2009058782 A | 3/2009 |
| JP | 2009145791 A | 7/2009 |
| JP | 2010003755 A | 1/2010 |
| JP | 2010054547 A | 3/2010 |
| JP | 2010256784 A | 11/2010 |
| JP | 2011023532 A | 2/2011 |
| JP | 2011128330 A | 6/2011 |
| TW | 200627738 A | 8/2006 |
| WO | 9532518 A1 | 11/1995 |
| WO | 9617372 A1 | 6/1996 |
| WO | 0244807 A2 | 6/2002 |
| WO | 0248785 A2 | 6/2002 |
| WO | 03069263 A2 | 8/2003 |
| WO | 2004066460 A1 | 8/2004 |
| WO | 2005022705 A2 | 3/2005 |
| WO | 2006026540 A2 | 3/2006 |
| WO | 2009082460 A2 | 7/2009 |
| WO | 2010037106 A2 | 4/2010 |
| WO | 2012128354 A1 | 9/2012 |
| WO | 2012154468 A2 | 11/2012 |
| WO | 2013006867 A1 | 1/2013 |
| WO | 2013015940 A2 | 1/2013 |
| WO | 2014067754 A2 | 5/2014 |

OTHER PUBLICATIONS

Armstrong, Carter M.The Quest for the Ultimate Vacuum Tube, Spectrum IEEE, Dec. 2015, 4 pgs.

Black, E.Ligo Technical note LIGO-T980045-00-D, "Notes on the Pound-Drever-Hall technique," Caltech and MIT (Apr. 16, 1998), 15 pages.

Cheng-Ping Huang et al., "Effect of electro-optic modulation on coupled quasi-phase-matched frequency conversion", Applied Optics, Optical Society of America, Aug. 10, 2005, vol. 44, No. 23, 4980-4984.

Dianov et al., Bi-doped fiber lasers: new type of high-power radiation sources, Conference on Lasers and Electro-Optics, May 6-11, 2007, 2 pages.

Ding, MengField Emission from Silicon, MIT 2001, 277 pgs.

Dreyer, R.W.P., et al, Laser Phase and Frequency Stabilization Using an Optical Resonator, Applied Physics B. vol. 31, No. 2, Jun. 1983, pp. 97-105.

(56) References Cited

OTHER PUBLICATIONS

Dulinski et al., Tests of a backside illuminated monolithic CMOS pixel . . . , Nuclear Instruments and Methods in Physics Research A 546 (2005) 274-280, 7 pgs.
Fanton et al, Multiparameter Measurements of Thin Film . . . , Journal of Applied Physics, vol. 73, No. 11, p. 7035 (1993).
Fowler, R. H., et al, Electron Emission in Intense Electric Fields, Mar. 31, 1928, 9 pgs.
GuptaThe Handbook of Photonics, 2007 CRC Press, 2nd Ed, pp. 6-27, 6-29.
Hansch et al, Laser Frequency Stabilization by Polarization Spectroscopy of a Reflecting Reference Cavity, Optics Communications, vol. 35, No. 3, Dec. 1980, pp. 441-444.
Herriott et al., Folded Optical Delay Lines, Applied Optics 4, #8, pp. 883-889 (1965).
Herriott et al., Off-Axis Paths in Spherical Miccor Interferometers, Applied Optics 3, #4, pp. 523-526 (1964).
Huang et al., Back-Side Illuminated Photogate CMOS . . . , IEEE Sensors Journal, vol. 11, No. 9, Sep. 2011, 5 pgs.
Huang et al, Effect of electro-optic modulation on coupled quasi-phase-matched frequency conversion, Applied Optics, vol. 44, No. 23, pp. 4980-4984 (2005).
ISR and Written Opinion dated Oct. 24, 2014 for PCT/US2014/041965.
ISR and Written Opinion dated May 13, 2014 for PCT/US2014/012902.
ISR and Written Opinion dated May 20, 2014 for PCT/US2014/016198.
ISR and Written Opinion dated Jul. 11, 2014 for PCT/US2014/030989.
Itzler et al., InP-based Geiger-mode . . . , Proc. SPIE vol. 7320 (2000), 12 pgs.
Jundt, Dieter H. Temperature-dependent Sellmeier equation for the index of refraction, ne, in congruent lithium niobate, Optics Letters, vol. 22, No. 20, Oct. 15, 1997, pp. 1553-1555.
Kalita et al., Multi-watts narrow-linewidth all fiber Yb-doped laser operating at 1179 nm, Optics Express, 18 (6), pp. 5920-5925 (2010).
Kaneda; et al., "Theoretical treatment, simulation, and experiments of doubly resonant sum-frequency mising in an external resonator", Applied Optics, Optical Society of America, Oct. 20, 1997, vol. 38, Issue No. 30, 7766-7775.
Kashiwagi et al., Over 10W output linearly-polarized single-stage fiber laser oscillating above 1160 nm using Yb-doped polarization-maintaining solid photonic bandgap fiber, IEEE Journal of Quantum Electronics, 47 (8), pp. 1136-1141 (2011).
Kavita; Devi et al., "Tunable, continuous-wave, ultraviolet source based on intracavity sum-frequency-generation", 2013 Optical Society of America, Optics Express, Oct. 21, 2013, vol. 21, No. 21, 8 pages.
KLA-Tencor Coporation, filed U.S. Appl. No. 62/059,368, filed Oct. 3, 2014 and entitled "183nm Laser and Inspection System".
Koike, AkifumiField Emitter Equipped With a Suppressor to Control Emission Angel, IEEE Electron Device Letters, vol. 34, No. 5, May 2013, 3 pgs.
Liu et al, Quasi-Cw Ultraviolet Generation in a Dual-periodic LiTaO3 Superlattice by Frequency Tripling, Japanese Journal of Applied Physics, vol. 40, pp. 6841-6844 (2001).
Mead et al., Solid-state lasers for 193-nm photolithography, Proc. SPIE 3051, Optical Microlithography X, pp. 882-889 (Jul. 7, 1997).
Meyn et al, Tunable ultraviolet radiation by second-harmonic generation in periodically poled lithium tantalate, Opt. Lett., vol. 22, No. 16, Aug. 15, 1997, pp. 1214-1216.
Mizuuchi et al, Continuous-wave ultraviolet generation at 354nm in a periodically poled MgO:LiNbO3 by frequency tripling of a diode end-pumped Nd:GdVO4 microlaser, Appl. Phys. Lett. vol. 85, No. 18, Nov. 2004, pp. 3959-3961.
Nagao, Masayoshi, Cathode Technologies for Field Emission Displays, IEEJ Trans 2006; 1:171-178, 8 pgs.
Nagao, MasayoshiFabrication of a Field Emitter Array with a Built-In Einzel Lens, JJAP 48 (2008) 06FK02, 4 pgs.
Neo, YoichiroElectron Optical Properties of Microcolumn with Field Emitter, JJAP 52 (2013) 036603, 5 pgs.
Niclass et al., Design and Characterization of a CMOS 3-D . . . , IEEE Journal Solid-State Circuits, vol. 40, No. 9, Sep. 2005, 8 pgs.
Omatsu et al., High repetition rate Q-switching performance . . . , Optics Express vol. 14, Issue 7, pp. 2727-2734, Apr. 3, 2006.
Paetzel et al., Activation of Silicon Wafer by Excimer Laser, 18th IEEE Conf. Advanced Thermal Processing of Semiconductors-RTP 2010, 5 pgs.
Rakhshandehroo, M.R. et al, Fabrication of a self-aligned silicon field emission . . . , JVSTB, 16, 765 (1998); doi: 10.1116/1,589900, 6 pgs.
Rakhshandehroo, M.R. et al, Field emission from gated Si emitter tips with precise . . . , JVSTB, 15, 2777 (1997); doi: 10.1116/1.589726, 6 pgs.
Raoult, Efficient generation of narrow-bandwidth . . . , Jul. 15, 1998, vol. 23, No. 14, Optics Letters, pp. 1117-1119.
S. Chaitanya Kumar et al., "Optimally-output-coupled, 17.5 W, fiber-laser-pumped continuous-wave optical parametric oscillator", Applied Physics B, Applied Physics B, Jun. 12, 2010, vol. 10.1007, 31-35 (5 pages), 2010.
Saikawa et al., 52 mJ narrow-bandwidth degenerated optical parametric system with a large-aperture periodically poled MgO:LiNbO3 device, Optics Letters, 31 (#21), 3149-3151 (2006).
Sakic, Agata, Boron-layer silicon photodiodes for high-efficiency low-energy electron detection, Solid-State Electronics 65-66 (2011), pp. 38-44.
Sakuma et al., High power, narrowband, DUV laser source by frequency mixing in CLBO, Advanced High-Power Lasers and Applications, Nov. 2000, pp. 7-14, Ushio Inc.
Sakuma et al, High-Power CW Deep-UV Coherent Light Sources Around 200 nm Based on External Resonant Sum-Frequency Mixing, IEEE Journal of Selected Topics in Quantum Electronics, vol. 10, No. 6, pp. 1244-1251, 2004.
Sakuma et al., True CW 193.4-nm light generation based on frequency conversion of fiber amplifiers, Optics Express 19 (16), 15020-15025 (2011).
Sarubbi et al., Pure boron-doped photodiodes . . . IEEE, Sep. 15, 2008, pp. 278-281.
Sasaki, T. et al., Progress in the growth of a CsLiB6O10 crystal and its application to ultraviolet light generation, Optical Materials, vol. 23, 343-351 (2003).
Sato, T., et al, Fabrication and characterization of HfC coated . . . , J. Vac. Sci. Technol. B 2194), published Jul. 31, 2003, 5 pgs.
Serbun Pavel et al, Stable field emission of single B-doped . . . , JVSTB, 31, 02B101 (2013); doi: 10.1116/1.4765088, 7 pgs.
Shirakawa et al., High-power Yb-doped photonic bandgap fiber amplifier at 1150-1200nm, Optics Express 17 (2), 447-454 (2009).
Stevanovic et al., A CMOS Image Sensor for High-Speed Imaging, 2000 IEEE int'l. Solid-State Circuits Conf., 3 pgs.
Ter-Mikirtychev et al., Tunable LiF:F2—color center laser with an intracavity integrated-optic output coupler, Journal of Lightwave Technology, 14 (10), 2353-2355 (1996).
Torabi-Goudarzi et al, Efficient CW high-power frequency doubling in periodically poled KTP, Optics Communications, vol. 227, Issues 4-6, Nov. 15, 2003, pp. 389-403.
Utsumi, TakaoVacuum Microelectrnoics: What's New and Exciting, IEEE vol. 38, No. 10, Oct. 1991, 8 pgs.
Watanabe et al, Continuous-wave sum-frequency generation . . . ; Jan. 1, 1992; Optics Letters, vol. 17, No. 1, pp. 46-48.
Xiaogian, Fu, Higher Quantum Efficiency by Optimizing . . . 2010, 978-1-4244-6644-3/10 IEEE, pp. 234-235.
Yoo et al., Excited state absorption measurement in bismuth-doped silicate fibers for use in 1160 nm fiber laser, 3rd EPS-QEOD Europhoton Conference, Paris, France, Aug. 31-Sep. 5, 2008, 1 page.
Zavartsev et al., High efficient diode pumped mixed vanadate crystal Nd:Gd0.7Y0.3VO4 laser, International Conference on Lasers, Applications, and Technologies 2007: Advanced Lasers and Systems, Valentin A. Orlovich et al. ed., Proc. of SPIE vol. 6731, 67311P (2007), 5 pages.

* cited by examiner

| First Fundamental laser type | Nd:Vanadate, Nd:YAG, Yb-doped fiber | Nd:Vanadate, Nd:YAG, Yb-doped fiber | Nd:YLF | Yb-doped fiber Yb:YAG |
|---|---|---|---|---|
| ω wavelength (nm) | 1064 | 1064 | 1047 | 1030 |
| 2ω Wavelength (nm) | 532 | 532 | 514.5 | 515.5 |
| 4ω Wavelength (nm) | 266 | 266 | 261.75 | 257.8 |
| 5ω Wavelength (nm) | 212.8 | 212.8 | 209.4 | 206 |
| Second fundamental laser type (lasing medium) | Nd:YAG | Nd:Vanadate | Er-doped fiber | Er:YAG |
| ω₂ Wavelength (nm) | 1319 | 1342 | 1535 | 1645 |
| 5ω + ω₂ wavelength (nm) | 183.2 | 183.7 | 184.3 | 183.1 |

Figure 4

183 NM CW LASER AND INSPECTION SYSTEM

PRIORITY APPLICATIONS

The present application is a divisional of U.S. patent application Ser. No. 15/806,953, entitled "183 NM CW LASER AND INSPECTION SYSTEM" filed Nov. 8, 2017, now U.S. Pat. No. 10,175,555, which claims priority to U.S. Provisional Patent Application 62/441,875 entitled "183 nm CW Laser and Inspection System", filed by Chuang et al. on Jan. 3, 2017.

BACKGROUND OF THE DISCLOSURE

Field of the Disclosure

The present application relates to continuous wave (CW) lasers and inspection systems used to inspect, e.g., photomasks, reticles, and semiconductor wafers.

Related Art

As semiconductor devices' dimensions shrink, the size of the largest particle or pattern defect that can cause a device to fail also shrinks. Hence a need arises for detecting smaller particles and defects on patterned and unpatterned semiconductor wafers and reticles. The intensity of light scattered by particles smaller than the wavelength of that light generally scales as a high power of the dimensions of that particle (for example, the total scattered intensity of light from an isolated small spherical particle scales proportional to the sixth power of the diameter of the sphere and inversely proportional to the fourth power of the wavelength). Because of the increased intensity of the scattered light, shorter wavelengths will generally provide better sensitivity for detecting small particles and defects than longer wavelengths.

Since the intensity of light scattered from small particles and defects is generally very low, high illumination intensity is required to produce a signal that can be detected in a very short time. Average light source power levels of 0.3 W or more may be required. At these high average power levels, a high pulse repetition rate is desirable as the higher the repetition rate, the lower the energy per pulse and hence the lower the risk of damage to the system optics or the article being inspected. The illumination needs for inspection and metrology are generally best met by continuous wave (CW) light sources. A CW light source has a constant power level, which avoids the peak power damage issues and also allows for images or data to be acquired continuously.

Therefore, a need arises for a CW laser that generates radiation in deep ultraviolet (DUV) range, particularly shorter than 193 nm, and is suitable for use in inspection of photomasks, reticles, and/or wafers. However, at many wavelengths of interest, particularly ultraviolet (UV) wavelengths, CW light sources of sufficient radiance (power per unit area per unit solid angle) are not available, are expensive or are unreliable. If a beam source enabling CW output at near 183 nm at higher power level can be practically produced, it could enable more accurate and fast inspection/metrology and contribute to cutting-edge semiconductor production.

Pulsed lasers for generating Deep UV (DUV) light are known in the art. Prior-art excimer lasers for generating light at 193 nm are well known. Unfortunately, such lasers are not well suited to inspection applications because of their low laser pulse repetition rates and their use of toxic and corrosive gases in their lasing medium, which leads to high cost of ownership. A small number of solid state and fiber based lasers for generating light near 193 nm output are also known in the art. Exemplary lasers use two different fundamental wavelengths (e.g. US 2014/0111799 by Lei et al.) or the eighth harmonic of the fundamental (e.g. U.S. Pat. No. 7,623,557 by Tokuhisa et al.), either of which requires lasers or materials that are expensive or are not in high volume production. Another approach (U.S. Pat. No. 5,742,626 to Mead et al.) has not resulted in a commercial product with stable output and high power as required for semiconductor inspection applications (approximately 0.3 W or more is typically required in a laser that can run continuously for three or more months between service events). Moreover, most of these lasers have very low power output and are limited to laser pulse repetition rates of a few MHz or less. Recently, Chuang et al. has filed a patent (US Pub. App. No. 2016/0099540) on 183 nm mode-locked laser and related inspection system.

However, CW lasers with wavelength in the sub-200 nm are not commercially available at sufficient power level or very unreliable. An exemplary laser as described in U.S. Pat. No. 8,503,068 by Sakuma, may generate 193 nm CW radiation at about 100 mW with a complex apparatus comprising three fundamental lasers at different wavelengths, but the stability is really unknown. There have not been any prior-art for generating CW light in the wavelength range down to approximately 183 nm.

Currently available deep UV (DUV), i.e. a wavelength shorter than 300 nm, CW lasers operate by generating the fourth harmonic of an infra-red (IR) fundamental laser. Two frequency conversion stages are required. The first stage generates a second harmonic, and the second stage generates a fourth harmonic. Each frequency doubling stage uses a non-linear optical (NLO) crystal. The frequency doubling process depends on the square of the electric field strength. If the power density inside the crystal is low, the conversion process is very inefficient. An infra-red laser of a few Watts or a few tens of Watts of power, when focused into a non-linear crystal, produces very little second harmonic because of the low power density. This is in contrast to a pulsed laser of a similar average power level, which can produce substantial amounts of $2^{nd}$ harmonic (in the best cases roughly 50% of the input can be converted to the second harmonic) because the peak power density is many times higher than the average power density.

DUV CW lasers use resonant cavities to increase the power density in the NLO crystals in order to improve the conversion efficiency. Most of the light that passes through the crystal without being converted to the second harmonic is recirculated in the resonant cavity so as to build up the power density. The second harmonic is allowed to pass out of the cavity. Eventually the power density builds up to a level where the power leaving the cavity as second harmonic plus the losses in the cavity equals the input power. In order to generate deep UV wavelengths two of these cavities must be connected in series. The first cavity generates the second harmonic (a visible wavelength, typically a green wavelength such as 532 nm) by recirculating the IR fundamental and the second cavity generates the fourth harmonic (a deep UV wavelength such as 266 nm) by recirculating the second harmonic.

FIG. 1 shows the major components of a prior-art deep-UV CW laser including two cavities. In this figure the cavity that generates the second harmonic comprises mirrors 110, 111, 112 and 113, and NLO crystal 115. The cavity that generates the fourth harmonic comprises mirrors 130, 131, 132 and 133, and NLO crystal 135. This figure also shows another important aspect of prior art devices. The resonant cavities need to be actively controlled. The control for the first cavity comprises oscillator 104 generating a signal at frequency f1, modulator 103, photodiode 105 and synchronous detector 106 which generates actuator control signal 107 to control the position of mirror 111. The control for the second cavity comprises oscillator 124 generating a signal at frequency f2, modulator 123, photodiode 125 and synchronous detector 126 which generates actuator control signal 127 to control the position of mirror 131.

IR light (at 1064 nm in wavelength) enters the first cavity through mirror 110 and, after reflecting from mirrors 111 and 112, enters NLO crystal 115. A portion of the IR light entering crystal 115 is converted to the second harmonic at a wavelength of 532 nm. The 532 nm light passes through mirror 113 and is directed to the second resonant cavity. Most of the IR light passing through crystal 115 emerges from the crystal without being converted and reflects from mirror 113, which is coated so as to reflect 1064 nm light while transmitting 532 nm light. Light reflected from mirror 113 arrives back at input mirror 110. The coating on mirror 110 is designed to be highly reflective to the IR arriving at the angle of incidence of the ray from mirror 113, while being highly transmissive to the incoming IR radiation arriving from the fundamental laser 101. In order to build up a high power density in the cavity, it is important that the IR radiation that has circulated around the cavity arrive at mirror 110 in phase with the incoming radiation. This is achieved as illustrated by a servo control which mechanically moves mirror 111 by means of a piezo-electric transducer or a voice coil to maintain the correct cavity length. Photodiode 105 monitors a small portion of the light circulating in the cavity in order to provide a signal to the servo control. The input laser beam is modulated by modulator 103 at frequency f1 in order to provide a time-varying signal that is used by the servo control to determine whether the cavity needs to be adjusted and in which direction the cavity should be adjusted.

The laser cavity servo control loop described above is commonly used and known as Pound-Drever-Hall or PDH control. Its theory is described by Drever et al. "Laser phase and frequency stabilization using an optical resonator"; Appl. Phys. B 31 (2): 97-105, (1983). Some additional details can be found in U.S. Pat. No. 5,367,531 and LIGO Technical note LIGO-T980045-00-D by Black (1998).

The other locking scheme commonly used in some laser servo control loop is called Hänsch-Couillaud (HC) technique. In this locking scheme, no modulation is needed for the beam before entering the cavity, but it only works for cavities that are polarization sensitive. It detects the polarization change of the total reflected or transmitted beam to determine if the cavity is on resonance or not. Details can be found in the article by Hänsch and Couillaud "Laser frequency stabilization by polarization spectroscopy of a reflecting reference cavity", Opt. Commun. 35(3), 441 (1980).

The second cavity operates in a substantially similar manner to the first cavity except that the input wavelength is 532 nm and the output wavelength 266 nm. The coatings and materials of the second cavity components are chosen appropriately for those wavelengths. As shown in FIG. 1, a second modulator 123 modulates the light at frequency f2 prior to entering the second cavity. Photodiode 125 detects a small portion of the circulating light. The signal from 125 is used to generate a control signal 127 that controls the position of mirror 131 in order to maintain the correct length of the cavity.

In some prior art devices (not shown), the second modulator 123 is omitted and both servo loops operate at the same modulation frequency. In some prior art devices (not shown), neither modulator is present. Instead IR laser 101 generates a modulated output by operating the laser such that two modes are generated, those two modes being chosen to have a wavelength separation and relative amplitudes such that an appropriately modulated output is generated by the beating of the two modes.

In some prior art devices, the cavity may comprise two or three mirrors instead of four.

In some prior art devices, the DUV output wavelength may be separated from the recirculating visible light by a beam splitter (not shown) placed between the NLO crystal 135 and the cavity mirror 133.

The illumination needs for inspection and metrology are generally best met by continuous wave (CW) light sources. A CW light source has a constant power level, which allows for images or data to be acquired continuously.

A pulsed light source has an instantaneous peak power level much higher than the time-averaged power level of a CW light source. The very high peak power of the laser pulses results in damage to the optics and to the sample or wafer being measured, as most damage mechanisms are non-linear and depend more strongly on peak power rather than on average power. The higher the pulse repetition rate, the lower the instantaneous peak power per pulse for the same time-averaged power level. So in some cases, an additional pulse multiplier may be used to increase the repetition rate which adds more system complexity.

In addition, mode-locked laser typically have relatively broad bandwidth compared to CW laser. So the illumination optical system design in inspection/metrology tools is more complicated in order to minimize the aberration and increase the sensitivity, which also makes the system cost significantly higher.

Prior-art DUV CW lasers that generate the fourth harmonic of an infra-red (IR) fundamental laser could not produce wavelengths lower than 230 nm. At many lower wavelengths of interest, particularly ultraviolet (UV) wavelengths in the sub-200 nm range, CW light sources of sufficient radiance (power per unit area per unit solid angle) are not available, are expensive or are unreliable. There has not been any prior-art for generating CW light in the wavelength range down to approximately 183 nm.

Therefore, a need arises for providing an inspection system and associated laser systems that is capable of generating CW laser light having an output wavelength in the range of approximately 181 nm to approximately 185 nm and avoids some, or all, of the above problems and disadvantages.

SUMMARY OF THE DISCLOSURE

The present invention relates to an improvement in inspection systems utilized in the semiconductor fabrication industry, and in particular to laser assemblies for such inspection systems that are capable of generating CW laser light having an output wavelength in the range of approximately 181 nm to approximately 185 nm (e.g., approximately 183 nm) and having a light source power level of 0.3 W or more. Note that in the following description, where a wavelength is mentioned without qualification, that wavelength may be assumed to be the wavelength in vacuum.

In accordance with the laser assemblies and associated methods described herein, CW laser output light at approximately 183 nm can be produced by way of generating a first fundamental light having a first fundamental frequency with a corresponding wavelength in the range of approximately 1000 nm to approximately 1100 nm, utilizing the first fundamental light to generate both a fourth harmonic of the first fundamental light and a fifth harmonic of the first fundamental light, and then generating the CW laser output light by mixing the fifth harmonic light with a second fundamental light having a second fundamental frequency with a corresponding a wavelength in the range of approximately 1260 nm to approximately 1820 nm. According to an aspect of the invention, the fifth harmonic light is generated by mixing the first fundamental light and the fourth harmonic light by circulating the first fundamental light in a (first) cavity configured to resonate at the first fundamental frequency such that the circulated first fundamental light passes through a first nonlinear crystal, and directing the fourth harmonic light such that it also passes through the first nonlinear crystal (i.e., without being circulated in the first cavity) in a manner that combines the fourth harmonic light and the circulated first fundamental light to generate the fifth harmonic. In a similar manner, the CW laser output light is generated by mixing second fundamental light, which is being circulated in a (second) cavity that is configured to resonate at the second fundamental frequency and to direct the circulated second fundamental light through a second nonlinear crystal, with the fifth harmonic light that is directed to pass through the second nonlinear crystal (i.e., without being circulated in the second cavity) in a manner that combines the fifth harmonic light and the circulated second fundamental light. Configuring the first and second cavities to respectively resonate at the first and second fundamental frequencies and utilizing the first and second nonlinear crystals to combine the circulated fundamental light with the fourth and fifth harmonics, respectively, reduces noise generation and increases overall system stability and optics lifetime by avoiding the need for circulating the fourth harmonic and fifth harmonic light within the respective first and second cavities.

According to an embodiment of the present invention, laser assembly includes a first fundamental laser, a fourth harmonic generation module, a fifth harmonic generation module, a second fundamental laser and a frequency mixing module. The first fundamental laser is configured to generate the fundamental light have a fundamental wavelength (e.g., equal to one of approximately 1070 nm, approximately 1064 nm, approximately 1053 nm, approximately 1047 nm, or approximately 1030 nm) and a corresponding first fundamental frequency. The fourth harmonic generation module comprises two cascaded frequency doubling cavities, wherein the first frequency doubling cavity receives a first portion of the fundamental light and is followed by a second frequency doubling cavity, and is configured to generate the fourth harmonic light (i.e. having a fourth harmonic frequency (4ω) equal to four times the first fundamental frequency). The fifth harmonic generation module receives a second portion of the first fundamental light and also receives the fourth harmonic light from the fourth harmonic generation module, and is configured to generate fifth harmonic light (i.e. having a fifth harmonic frequency (5ω) equal to five times the first fundamental frequency) in an external cavity in which the first fundamental light circulates. The second fundamental laser is configured to generate the second light have a wavelength in the range of approximately 1260 nm to approximately 1820 nm and a corresponding second fundamental frequency. The frequency mixing module is optically coupled to receive the fifth harmonic light from the fifth harmonic generation module and configured to generate the 183 nm CW laser output having a frequency equal to sum of fifth harmonic frequency and the second fundamental frequency by way of mixing the second fundamental light and the fifth harmonic light, wherein the frequency mixing crystal is placed in an external enhancement cavity for the second fundamental light. An advantage of utilizing the external enhancement cavity to mix the fifth harmonic light and the second fundamental light is that the second fundamental laser may be an off-the-shelf laser rather than a custom device.

In an alternative embodiment of the present invention, laser assembly includes a fundamental laser, a fourth harmonic generation module, a fifth harmonic generation module, a pump laser and an intra-cavity frequency mixing module. The fifth harmonic of the first fundamental light is generated in a manner similar to that described above, but in this case the last frequency mixing stage to generate the 183 nm light, instead of using a second fundamental laser and an external resonant cavity to enhance the second fundamental light, utilizes an intra-cavity frequency mixing module. The intra-cavity frequency mixing module comprises a laser cavity that includes a gain medium and an NLO crystal. The gain medium is pumped by the pump laser with an appropriate wavelength to generate a second fundamental CW light having a second fundamental frequency with a corresponding wavelength between 1260 nm and 1820 nm. The NLO crystal is coupled to receive the fifth harmonic CW light from the fifth harmonic generation module and is configured to generate said 183 nm CW laser output having a frequency equal to sum of fifth harmonic of the first fundamental frequency and the second fundamental frequency by mixing said fifth harmonic light and the second fundamental light. An advantage of utilizing the intra-cavity frequency mixing approach is that fewer optical components are needed to implement this approach compared with using an external cavity.

In another alternative embodiment of the present invention, laser assembly includes a fundamental laser, a fourth harmonic generation module, a fifth harmonic generation module, a pump laser and a CW optical parametric oscillator (OPO) intra-cavity frequency mixing module. The fifth harmonic of the first fundamental light is generated in a manner similar to that described above, but in this case in the last frequency mixing stage to generate the 183 nm light, instead of using a second fundamental laser, utilizes an OPO intra-cavity frequency mixing module. The OPO intra-cavity frequency mixing module comprises a CW cavity resonant at a signal frequency that includes a periodically poled non-linear optical crystal and an NLO crystal. The periodically poled non-linear optical crystal is pumped by the pump laser with an appropriate wavelength to generate a CW signal light having a signal frequency with a corresponding wavelength between 1260 nm and 1820 nm. The NLO crystal is coupled to receive the fifth harmonic CW light from the fifth harmonic generation module and is configured to generate said 183 nm CW laser output having a frequency equal to sum of fifth harmonic of the first fundamental frequency and the second fundamental frequency by mixing said fifth harmonic light and the signal light. An advantage of utilizing a CW OPO intra-cavity frequency mixing approach is that the signal frequency can be selected or adjusted independently of the frequency of the pump laser, allowing precise selection of the frequency of the output light.

In one embodiment, at least one of the fifth harmonic generation module and the frequency mixing module includes an annealed, hydrogen-treated or deuterium-treated cesium lithium borate (CLBO) crystal that is configured to be nearly non-critically phase matched for generating a wavelength near 183 nm by mixing a wavelength between about 206 nm and 214 nm with an infra-red wavelength between approximately 1260 nm to approximately 1820 nm. Because of the near non-critical phase matching, the frequency mixing is very efficient (e.g. the non-linear coefficient can be approximately, or slightly larger than, 1 pm $V^{-1}$) and the walk-off angle is small (e.g. less than about 30 mrad). In a preferred embodiment, the annealed CLBO crystal for the fifth harmonic generation module is held at a constant temperature that is approximately 80° C. or lower, and the annealed CLBO crystal for the frequency mixing module is held at a constant temperature that is approximately 30° C. or lower.

BRIEF DESCRIPTION OF THE DRAWINGS

FIG. 4 is a table of exemplary wavelengths generated by and mixed within the laser assemblies of FIGS. 2A and 2B in accordance with alternative embodiments of the present invention.

DETAILED DESCRIPTION OF THE DRAWINGS

The present invention relates to an improvement in sensors for semiconductor inspection systems. The following description is presented to enable one of ordinary skill in the art to make and use the invention as provided in the context of a particular application and its requirements. As used herein, directional terms such as "top", "left", "right", "horizontal" and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
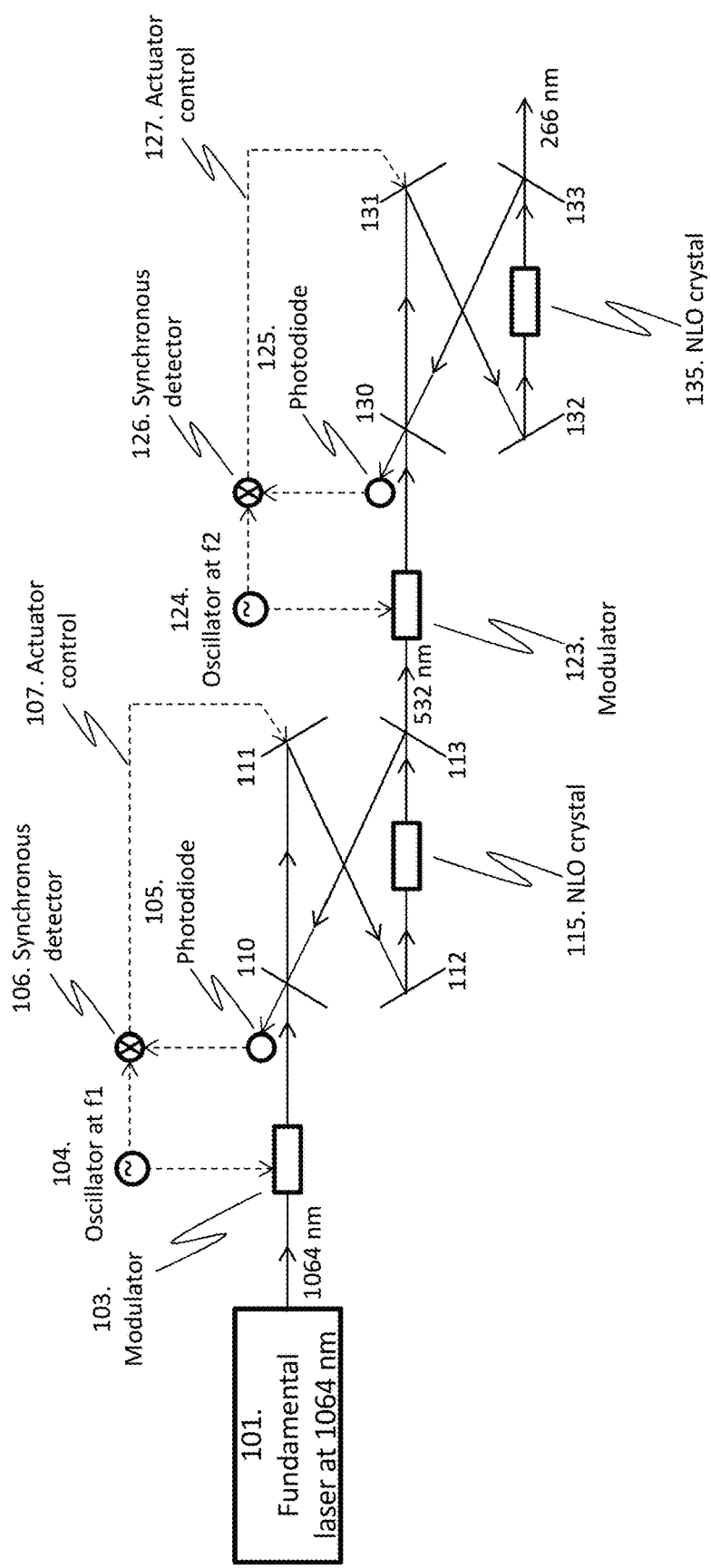
FIG. 1 illustrates a prior-art deep-UV CW laser.
Figure 2A:
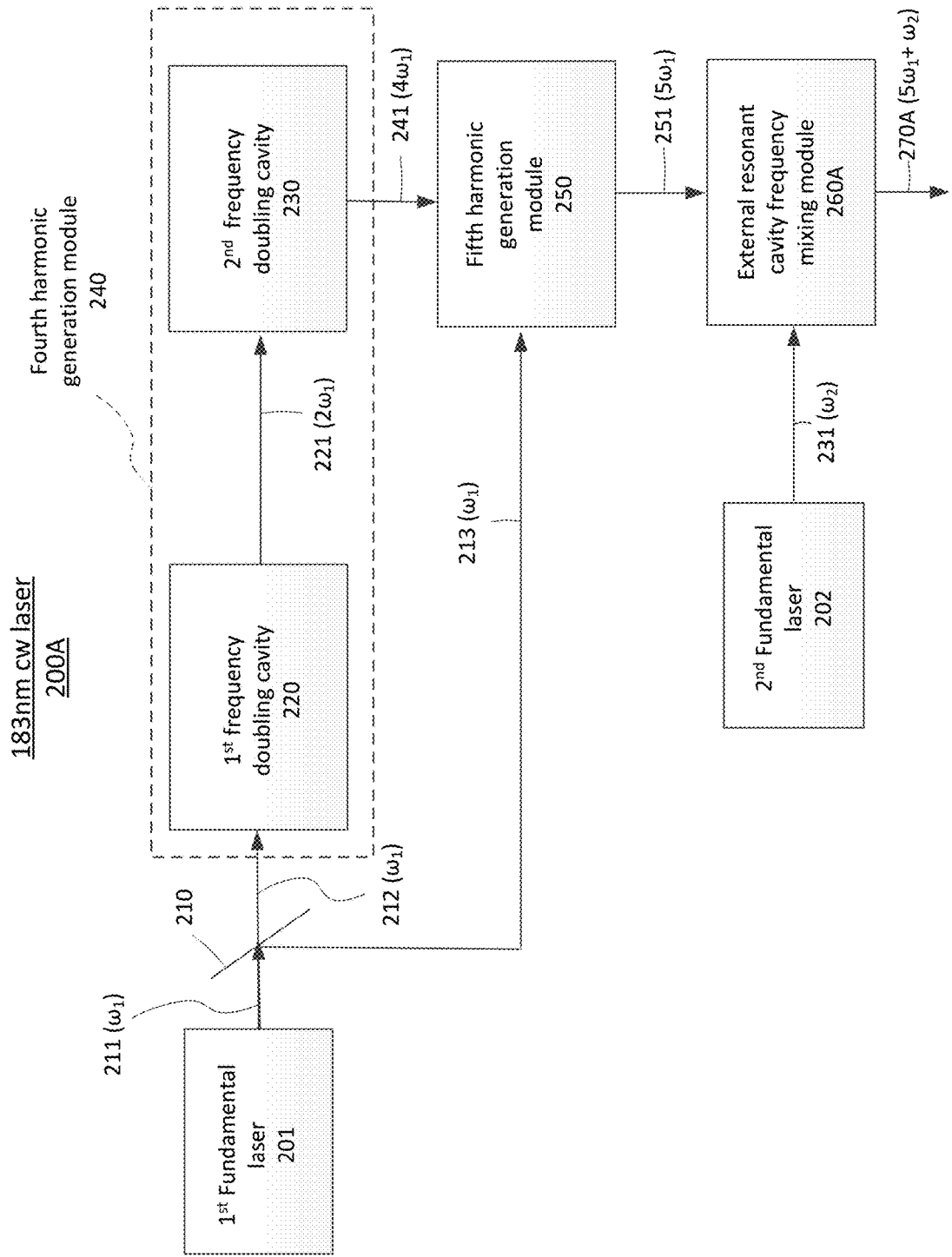
FIGS. 2A and 2B are simplified block diagrams showing exemplary CW laser assemblies according to exemplary embodiments of the present invention.
Figure 2B:
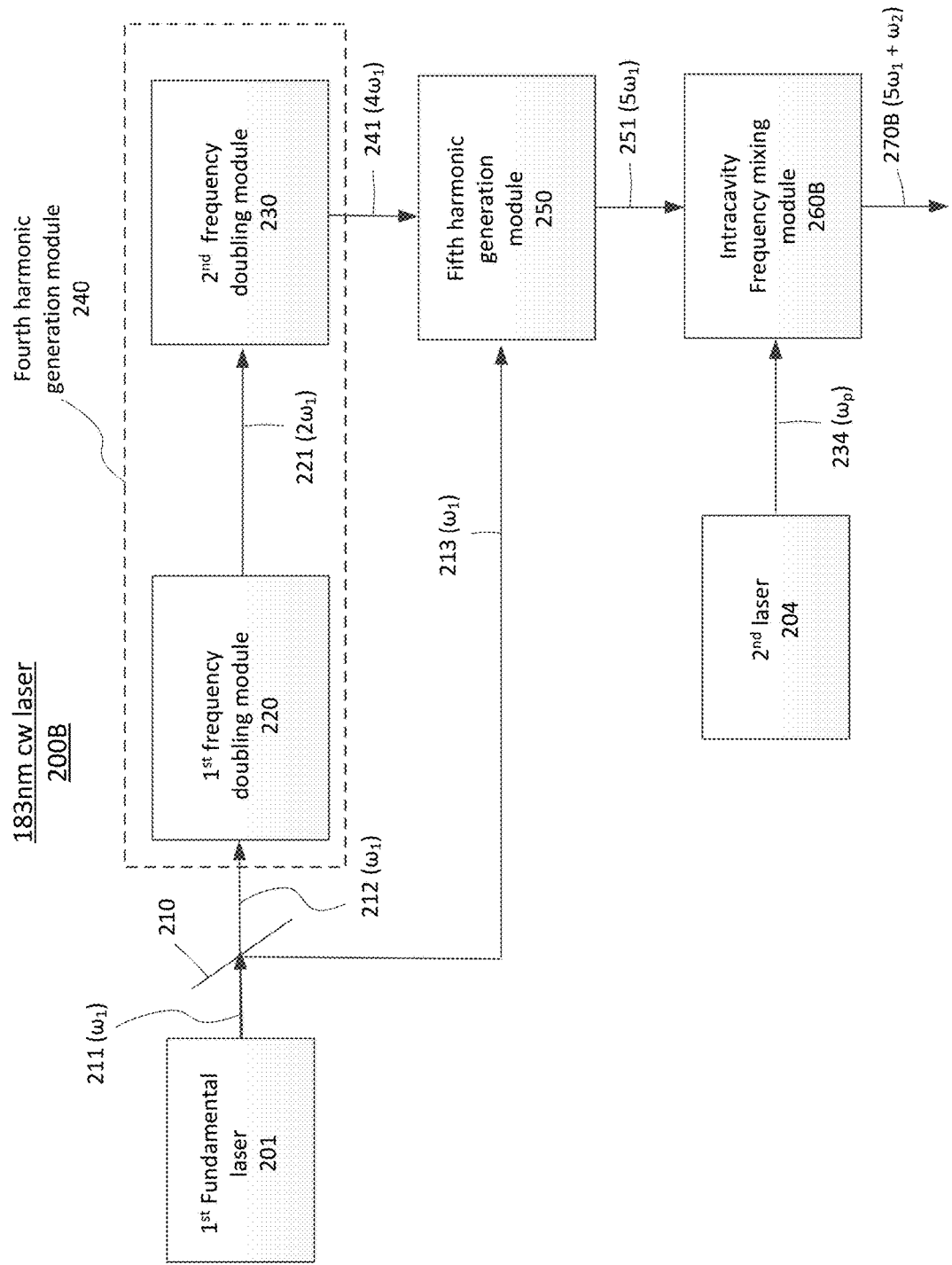

FIGS. 2A and 2B are simplified block diagrams showing exemplary CW laser assemblies with wavelength in the range of approximately 181 nm to approximately 185 nm (e.g., approximately 183 nm) according to exemplary embodiments of the present invention. Although laser assembly 200A and 200B differ in the design of the last frequency mixing module, they utilize substantially the same set of core optical components—a first fundamental laser 201, a fourth harmonic generation module 240, a fifth harmonic generation module 250, and a frequency mixing module that are arranged and configured to generate laser output light having a wavelength in the range of approximately 181 nm to approximately 185 nm. Note that the same core components are identified by the same reference numbers in each of FIGS. 2A and 2B to indicate that these core components are configured and function in the same or a similar manner in each of the two exemplary embodiments. Specifically, in each embodiment the first fundamental laser 201 is configured to generate fundamental light 211 having a first fundamental wavelength in the range of approximately 1000 nm to approximately 1100 nm (i.e., between about 1 μm and 1.1 μm) and a corresponding first fundamental frequency $\omega_1$. Fourth harmonic generation module 240 comprises two frequency doubling cavities, wherein the first frequency doubling cavity 220 receives at least a portion 212 of the first fundamental light 211 and generates the second harmonic light 221 with the second harmonic frequency $2\omega_1$ equal to twice the first fundamental frequency $\omega_1$ and the second frequency doubling cavity 230 receives the second harmonic light 221 and generates the fourth harmonic light 241 with the fourth harmonic frequency $4\omega_1$ equal to fourth of the first fundamental frequency $\omega_1$. Fifth harmonic generation module 250 receives a second portion 213 of the first fundamental light 211 and the fourth harmonic light 214, and implements frequency mixing in a resonant cavity such as that described below with reference to FIG. 3, wherein only the first fundamental light 211 circulates to enhance power, to generate fifth harmonic light 251 at a fifth harmonic frequency $5\omega_1$ equal to five times the first fundamental frequency $\omega_1$. Each frequency mixing module in laser assembly 200A and 200B is optically coupled to receive the fifth harmonic light 251 and configured to generate laser output light with frequency $5\omega_1+\omega_2$ by way of mixing the fifth harmonic light with a second fundamental light with frequency $\omega_2$. However, laser assembly 200A of FIG. 2A is distinguished in that a second fundamental laser 202 is configured to generate the second fundamental light 231 that is optically coupled to a second external resonant cavity formed in frequency mixing module 260A configured, for example, as described below with reference to FIG. 5A, such that power the second fundamental light $\omega_2$ is enhanced and mixed with the fifth harmonic $5\omega_1$. In contrast, in laser assembly 200B of FIG. 2B, frequency mixing of the fifth harmonic light 251 with the second fundamental light occurs within the laser cavity where the second fundamental light is generated via a gain medium while pumped with a beam 234 from a pump laser 204. The functional arrangement and operation of each of the core components mentioned above is described in additional detail below with reference to the detailed description of laser assembly 200A (FIG. 2A) and 200B (FIG. 2B).

Referring to FIGS. 2A and 2B, in addition to the core components mentioned above, laser assembly 200A and 200B utilizes a beam splitter 210 that is optically coupled between the first fundamental laser 211 and both the fourth harmonic generation module 240 and the fifth harmonic generation module 250. Specifically, the first fundamental laser 201 generates the first fundamental light 211 that is directed onto beam splitter 210, which functions to divide fundamental light 211 into two portions: a first portion 212 that is directed in a first (e.g., horizontal) direction to fourth harmonic generation module 220, and a second portion 213 that is directed in a second (e.g., downward) direction to fifth harmonic generator 250. Fifth harmonic generation module 250 mixes fundamental light portion 213 and the fourth harmonic light to generate fifth harmonic light 251 and then transmits it to frequency mixing module 260A (FIG. 2A) or 260B (FIG. 2B).

Referring to FIGS. 2A and 2B, the first fundamental CW laser 201 is configured using known techniques to generate the first fundamental CW light 211 (referred to simply as the "fundamental" in the industry) at fundamental frequency $\omega_1$. In one embodiment, the first fundamental laser 201 is configured such that the first fundamental light 211 is generated at a first fundamental frequency $\omega_1$ corresponding to an infra-red wavelength of approximately 1064 nm or 1070 nm. In an exemplary embodiment, the first fundamental laser 201 is implemented using one of a Nd:YAG (neodymium-doped yttrium aluminum garnate) lasing medium, a Nd-doped yttrium orthovanadate (Nd:YVO4) lasing medium, or by an ytterbium-doped fiber laser. Suitable fundamental CW lasers are commercially available from Coherent Inc., IPG Photonics and other manufacturers. Laser power levels for such fundamental lasers can range from milliWatts to tens of Watts or more. In an alternate exemplary embodiment, the first fundamental laser 201 is implemented by a laser using a Nd:YLF (neodymium-doped yttrium lithium fluoride) lasing medium that generates fundamental laser light at a fundamental wavelength near 1053 nm or 1047 nm. In yet another exemplary embodiment, fundamental laser 201 can be implemented using a Yb:YAG (ytterbium-doped yttrium aluminum garnate) lasing medium or by an ytterbium-doped fiber laser that generates fundamental laser light at a fundamental wavelength near 1030 nm.

According to the exemplary embodiments in FIGS. 2A and 2B, the fourth harmonic generation module 240 is configured to have two frequency doubling modules 220 and 230 in series and each of the frequency doubling module comprises an external resonant cavity including at least three optical mirrors and a nonlinear crystal arranged therein, respectively. As in prior art CW lasers, the cavities can be stabilized with standard PDH or HC locking techniques. The cavity length is adjusted to maintain resonance by adjusting the position of a mirror or prism through a control signal. The first frequency doubling module 220 receives and converts fundamental portion 212 at the fundamental frequency $\omega_1$ to generate the second harmonic light 221 at two times the first fundamental frequency ($2\omega_1$). Second frequency doubling module 230 receives and converts second harmonic light 221 to generate fourth harmonic light 241 at four times the first fundamental frequency ($4\omega_1$).

In some other embodiments (not shown), the first frequency doubling module may be combined with the fundamental laser to have the intra-cavity frequency doubling with the NLO crystal placed inside the fundamental solid state laser cavity and another external resonant cavity is configured to further double the frequency to generate the fourth harmonic light, in which case another fundamental laser may be used to generate first fundamental light portion 213 with the first fundamental frequency $\omega_1$ and optically couple it to the fifth harmonic generation module 250.

In a preferred embodiment, the first frequency doubling module 220 in FIGS. 2A and 2B that generates the second harmonic light 221 can include a Lithium triborate (LBO) crystal, which can be substantially non-critically phase-matched (for the appropriate choice of crystal plane) at temperatures between room temperature and about 200° C. for producing a second harmonic in a wavelength range between about 515 nm and about 535 nm. In some embodiments, the first frequency doubling module 220 may include a Cesium Lithium Borate (CLBO) crystal or a beta-Barium Borate (BBO) crystal, either of which can be critically phase matched for generating a second harmonic in a wavelength range between about 515 nm and about 535 nm. In some other embodiments, the first frequency doubling module 202 may include a KTiOPO$_4$ (KTP), periodically-polled lithium niobate (PPLN) crystal, or other nonlinear crystal for frequency conversion. The second frequency doubling module 230 that generates the fourth harmonic may use critical phase matching in CLBO, BBO or other non-linear crystal. In preferred embodiments, the second frequency doubling module 230 comprises hydrogen-treated or deuterium-treated CLBO crystal.

Further details of how a fourth harmonic of a CW fundamental IR laser can be generated with high power, low noise, and good stability, can be found in U.S. Pat. No. 9,293,882 by Chuang. This patent is incorporated herein by reference. Some alternative embodiments may be implemented to generate DUV CW lasers with frequency corresponding to a fourth or fifth harmonic of a CW fundamental IR laser. Further details of how to generate a more stable fourth or fifth harmonic of a CW fundamental IR laser with fewer resonant cavities or more stable cavities can be found in U.S. Patent Application US 20140362880 A1 filed on Jun. 2, 2014 by Chuang et al. This patent application is also incorporated herein by reference.

Figure 3:
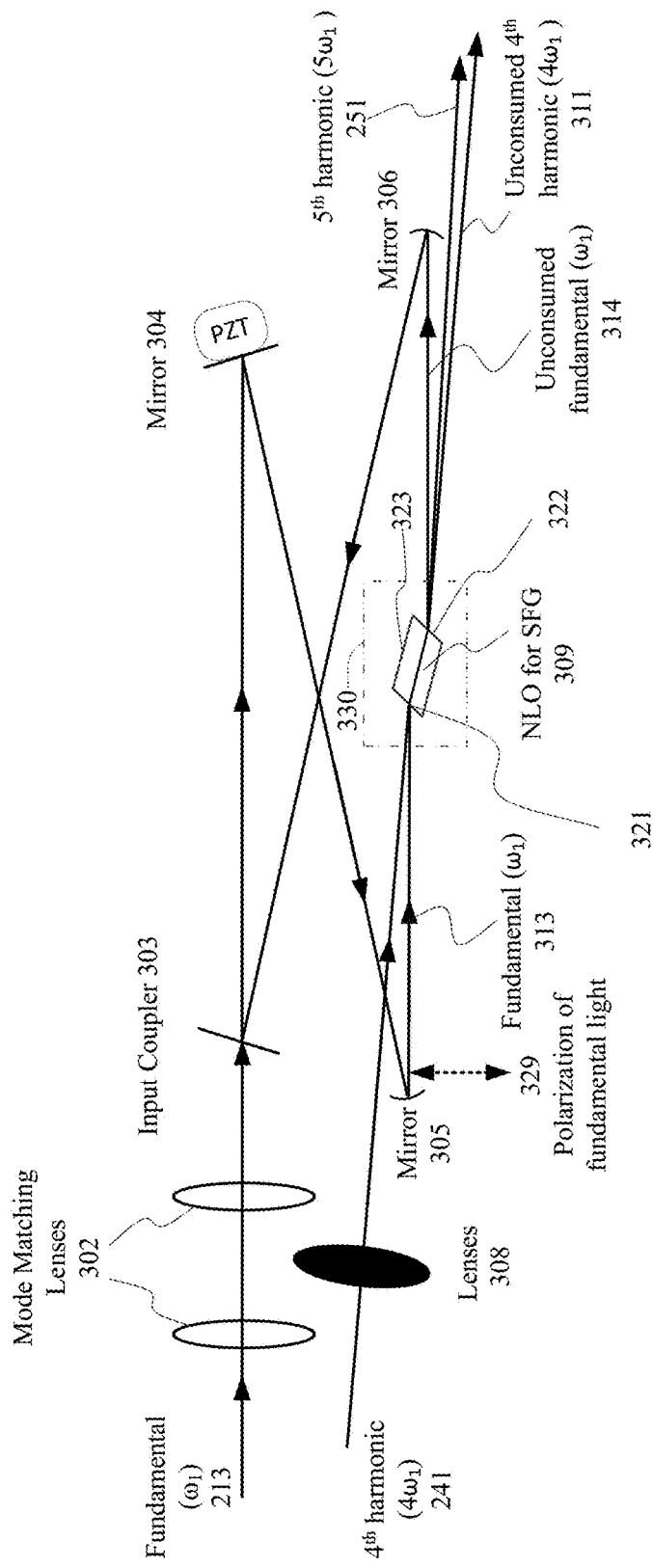
FIG. 3 is a simplified diagram showing an exemplary fifth harmonic generation module utilized in the laser assemblies of FIGS. 2A and 2B according to an embodiment of the present invention.

FIG. 3 is a simplified diagram showing an exemplary fifth harmonic generation module 250 utilized in the 183 nm laser assemblies of FIGS. 2A and 2B according to an embodiment of the present invention. The first fundamental ($\omega_1$) portion 213 enters the bow-tie ring cavity comprising flat mirror 303, 304, curved mirrors 305, 306 and a NLO crystal 309 (including an input surface 321 and an opposing output surface 322) through input coupler 303 and is recirculated to enhance the power. In the preferred embodiment as illustrated in FIG. 3, both input surface 321 and output surface 322 of crystal 309 are cut and positioned so as to be approximately at Brewster's angle relative to polarization of the first fundamental light 313, i.e., in the direction indicated by arrow 329 on the cavity plane of FIG. 3. Since fifth harmonic generation is preferably done by Type 1 frequency mixing using a non-linear optical crystal such as CLBO or BBO, the polarization of the fourth harmonic light will be substantially parallel to the polarization of the first fundamental light, so the input and output surfaces of crystal 309 are typically also close to the Brewster's angle of the fourth harmonic light 241. This angle minimizes reflection of both the first fundamental and the fourth harmonic light, and thus facilitates avoiding the need for an anti-reflection coating on both input surface 321 and output surface 322 of the NLO crystal 309 in some embodiments. The advantage of not coating crystal surfaces is that coatings can have a short lifetime when exposed to intense UV radiation. NLO crystal 309 is positioned to receive at input surface 321 both the fourth harmonic light 241 (i.e., from fourth harmonic generation module 240) and the fundamental light 313 circulating inside the cavity such that both the fourth harmonic light 241 and the first fundamental light 313 enter NLO crystal 309 approximately collinearly (e.g., after entering the crystal, the fourth harmonic light 241 and the fundamental light 313 travel in a direction approximately parallel to the crystal surface 323). To achieve this, the input fourth harmonic light 214 needs to come in at slightly deviated angle from the first fundamental light 313 circulating inside the cavity due to the chromatic dispersion of the NLO crystal. The generated fifth harmonic ($5\omega_1$) light 251 and the unconsumed fourth harmonic ($4\omega_1$) light 311 also exit through the Brewster-cut crystal at slightly deviated angles from the first fundamental light. In the preferred embodiments (as illustrated in FIG. 3), the fourth harmonic light 241/311 and the generated fifth harmonic light 251 are separated from the fundamental 313 far enough so that mirror 305 is not the in the beam path of incoming fourth harmonic 241 and mirror 306 is not in the beam path of the generated fifth harmonic light 251 or the unconsumed fourth harmonic light 311, therefore mirror 305/306 are coated only for high reflection at the first fundamental wavelength. In this embodiment, there are no DUV coatings in the cavity, so coating damage when exposed to DUV radiation is not an issue.

According to FIG. 3, the first fundamental light 213 is focused by lens set 302 before entering the cavity to match the intrinsic mode of the resonant cavity that has a beam waist inside or proximate to the NLO crystal 309 while the fourth harmonic light 241 is directed by mirrors or prisms (not shown) at an angle that is deviated from the first fundamental beam 313 by a small angle (such as by a few degrees) and focused by a lens or lens set 308 to a corresponding beam waist disposed inside or proximate to NLO crystal 309 (beam waists not shown). The unconsumed first fundamental ($\omega_1$) light 314 passes 309, gets reflected by mirror 306 and circulates inside the cavity to build up the intensity. If the enhanced fundamental ($\omega_1$) power density is intense enough, the conversion efficiency from the fourth harmonic light ($4\omega_1$) to the fifth harmonic ($5\omega_1$) is very high, up to or even higher than 50%. In this embodiment, the fifth harmonic frequency is generated using only cavities resonating at the first fundamental frequency $\omega_1$.

In an alternative embodiment, the deviation angle between the fourth harmonic light 241 and the first fundamental light 313 for them to enter the nonlinear crystal collinearly may be so small that mirror 305 is in the beam path of the input fourth harmonic light 241, and similarly mirror 306 is in the beam path of the unconsumed fourth harmonic light 311 and the generated fifth harmonic light 251. In another embodiment, the first fundamental 313 and the fourth harmonic 241 may be incident on NLO crystal 309 at substantially normal incidence (i.e. the first fundamental and fourth harmonic are traveling substantially collinear to one another). The input surface of the NLO crystal 309 may be coated with an appropriate anti-reflection coating. In any embodiment where the first fundamental and the fourth harmonic enter NLO crystal 309 substantially collinearly, the fifth harmonic light will exit NLO crystal 309 almost collinearly with (at a very small walk-off angle to) the first fundamental. In such cases, curved mirrors 305 and 306 may have dichroic coatings that allow the fourth and/or fifth harmonic to pass through efficiently while reflecting the fundamental with high efficiency. Alternatively, beam splitters or dichroic mirrors (not shown) may be inserted upstream and/or downstream of the NLO crystal 309 to combine, separate and direct the different harmonics as appropriate.

An optional beam splitter or wavelength separator may be utilized outside of the cavity to further separate out any unconsumed fourth harmonic light 311 (and, if necessary, any of the first fundamental light 314 that leaks out of the cavity) from fifth harmonic light 251. The beam splitter or wavelength separator may comprise a prism, a polarizing beam splitter, a dichroic beam splitter or a combination of optical elements.

In a preferred embodiment, NLO crystal 309 comprises an annealed (deuterium-treated or hydrogen-treated) cesium lithium borate (CLBO) crystal and the annealed CLBO crystal is held at a constant temperature of approximately 80° C. or lower by way of a suitable heating or cooling system 330 (e.g., an electric heater or a thermoelectric heater or cooler). In another embodiment, fifth harmonic generation module 250 may comprise a BBO or other non-linear crystal configured for frequency summation.

In an alternative embodiment, fifth harmonic generator may comprise a delta cavity, a standing-wave cavity, or other shaped cavity instead of a bow-tie cavity. If a standing-wave cavity is used, the fifth harmonic is generated in the same direction as the injected fourth harmonic light. As in prior art CW lasers, any of these cavities can be stabilized with standard PDH or HC locking techniques. The cavity length is adjusted to maintain resonance by adjusting the position of one of the mirrors (such as mirror 304 in FIG. 3) or the position of a prism, through a control signal (not shown) connected to a piezo-electric transducer (PZT), voice coil or other actuator.

FIG. 4 shows a table of exemplary wavelengths generated by and mixed within the laser assemblies of FIGS. 2A and 2B to generate laser output light 270 with wavelength approximately in the range of 181 nm to 185 nm (e.g., approximately 183 nm) in accordance with alternative embodiments of the present invention. For each first fundamental laser type, an exemplary first fundamental wavelength is shown, along with the wavelengths corresponding to the harmonics and an exemplary second fundamental laser type (lasing medium) along with the generated second wavelength required for the desired output wavelength (between 181 nm and 185 nm in the example shown in the table). The exact wavelength of a fundamental laser depends on many factors including the exact composition of the lasing medium, the operating temperature of the lasing medium, and the design of the optical cavity. Two lasers using the same laser line of a given lasing medium may operate at wavelengths that differ by a few tenths of 1 nm or a few nm due to the aforementioned and other factors. One skilled in the appropriate arts would understand how to choose the appropriate second fundamental wavelength in order to generate the desired output wavelength from any first fundamental wavelength close to those listed in the table. Similarly, if the desired output wavelength differs from 181 nm to 185 nm by a few nm, the desired output wavelength can also be achieved by an appropriate adjustment of the wavelength for the first or the second fundamental wavelength.

In alternative embodiments, the fundamental laser 201 is configured to generate fundamental light 211 at a fundamental frequency ω having a corresponding wavelength equal to one of approximately 1070 nm, approximately 1064 nm, approximately 1053 nm, approximately 1047 nm, and approximately 1030 nm, and the second fundamental light is configured to have a second frequency and corresponding wavelength that, when mixed with the fifth harmonic of the first fundamental frequency (e.g., approximately 1260 nm to 1420 nm for a fundamental wavelength of approximately 1064 nm or approximately 1070 nm), produces laser output light at approximately 183 nm. By way of further example, when the fundamental wavelength is approximately 1030 nm, the second fundamental light is generated with a wavelength of approximately 1490 nm to 1820 nm; and for fundamental lasers of approximately 1047 nm or approximately 1053 nm wavelength, the second fundamental light is generated with a wavelength between about 1290 nm and 1590 nm. Fundamental lasers capable of generating at least one of these second fundamental frequencies are typically readily available at reasonable prices in various power levels. For example, a Nd:YAG laser generating laser light with a wavelength of 1319 nm and a Nd:Vanadate laser generating laser light with wavelength of 1342 nm are available at power levels up to tens of W, and when mixed with the fifth harmonic of the first fundamental laser having wavelength at 1064 nm, laser output at 183.2 and 183.7 nm, respectively, will be produced. Similarly, if an Er:YAG (erbium-doped yttrium aluminum garnate) laser generating wavelength of approximately 1645 nm is mixed with the fifth harmonic of a first fundamental laser having a wavelength of 1030 nm, laser output at 183.1 nm is produced. In another example if an erbium (Er)-doped fiber laser generating a wavelength of approximately 1535 nm is mixed with the fifth harmonic of the first fundamental laser having wavelength at 1047 nm, laser output at 184.3 nm is produced. With the second fundamental light circulating in an external resonant cavity or inside the solid state laser cavity, the intra-cavity power level of the second fundamental light may be boosted to a few kW or even higher. Because near non-critical phase matching is used in the final frequency mixing module, that final conversion stage is efficient allowing stable output at power levels in the range of about hundreds of mW to a few W or more.

Figure 5A:
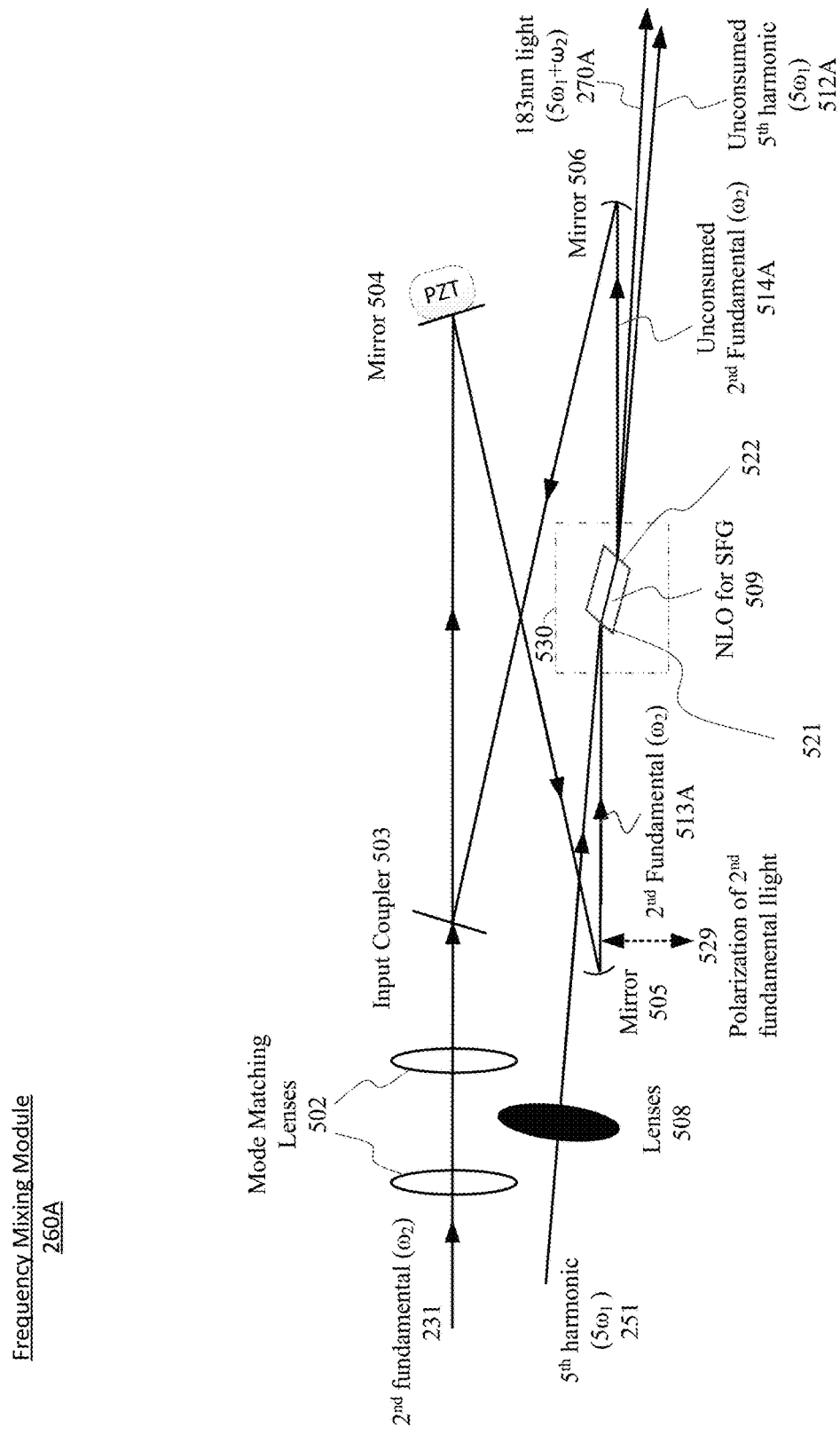
FIGS. 5A, 5B and 5C are simplified block diagrams showing exemplary frequency mixing modules utilized in the laser assemblies of FIGS. 2A and 2B according to alternative specific embodiments of the present invention.
Figure 5B:
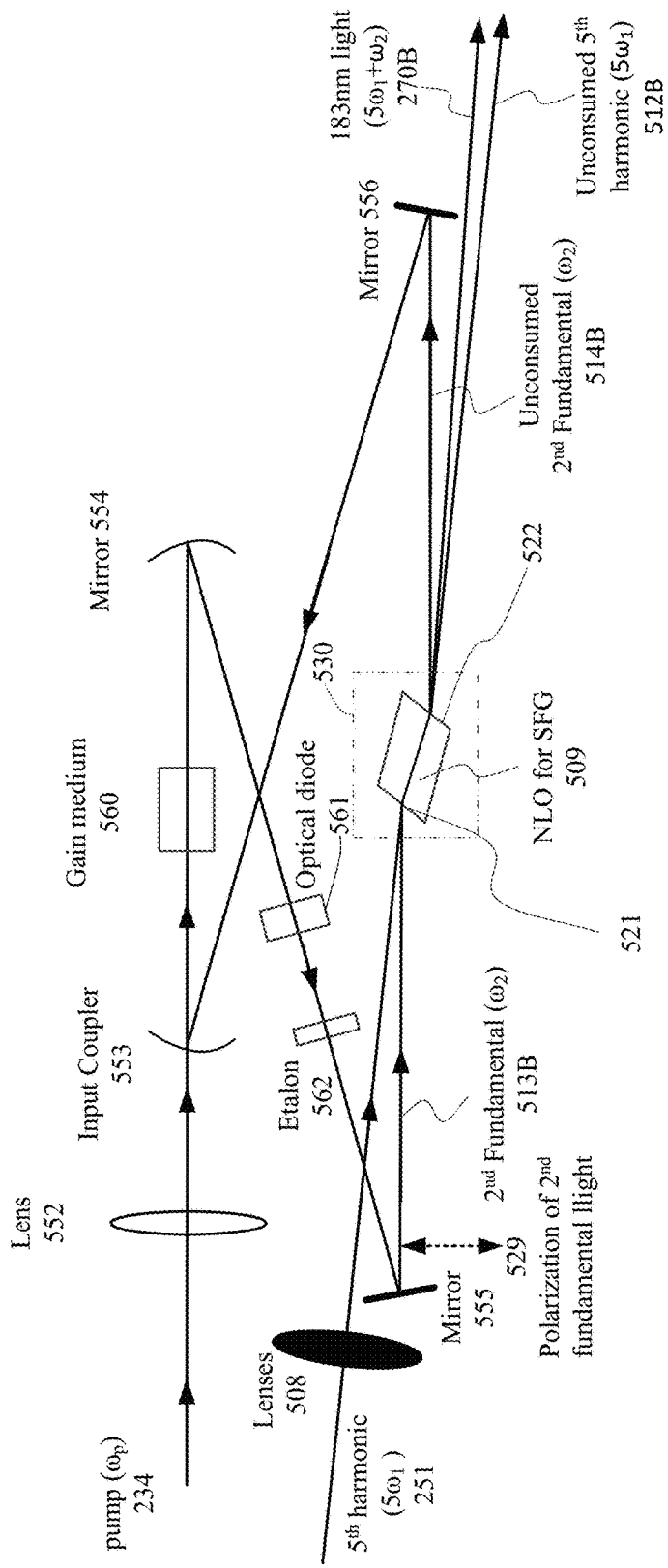
Figure 5C:
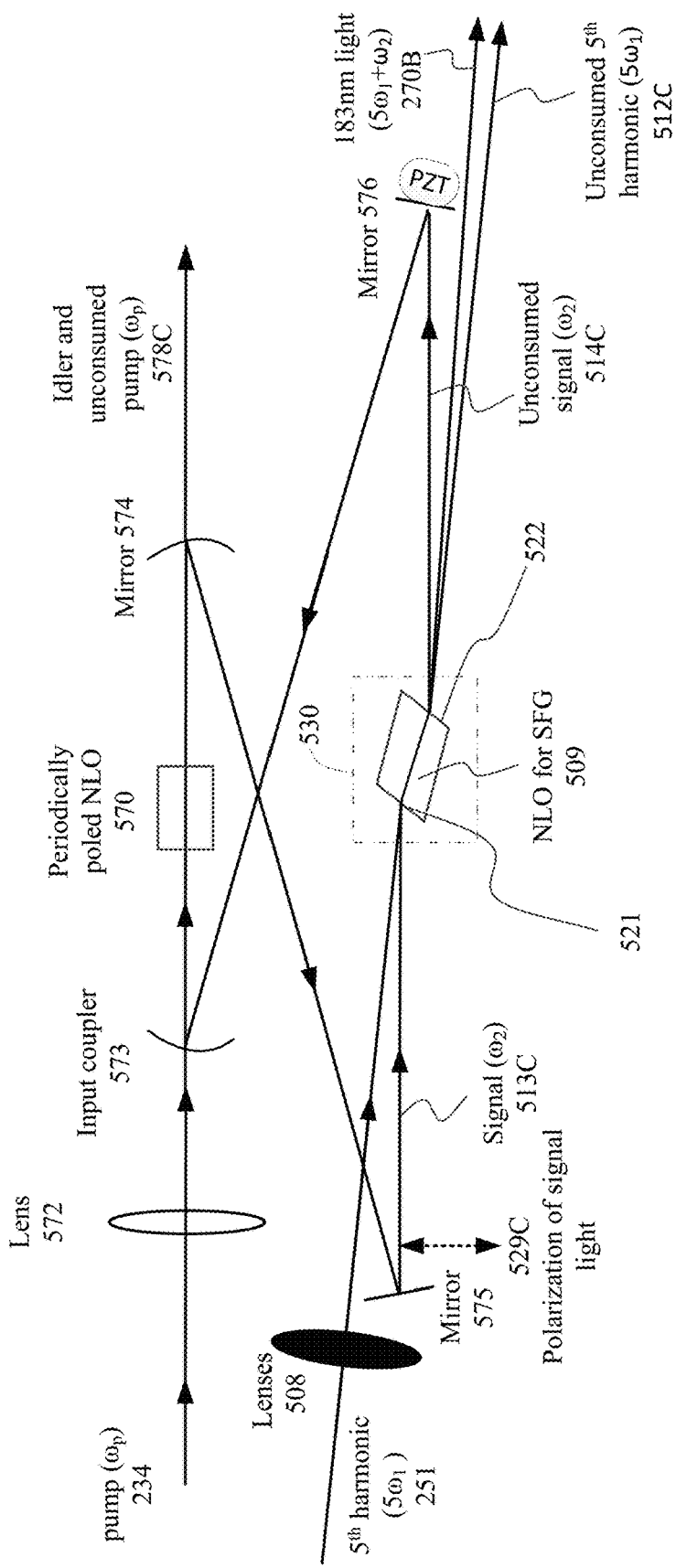

FIG. 5A is a simplified block diagram showing an exemplary frequency mixing module 260A utilized in the 183 nm CW laser 200A of FIG. 2A. FIGS. 5B and 5C are simplified block diagrams showing alternative exemplary embodiments of intra-cavity frequency mixing module 260B shown in FIG. 2B.

In one embodiment according to laser assembly of FIG. 2A, the frequency mixing module 260A is configured to combine the second fundamental light generated from a second fundamental laser and the fifth harmonic light from the fifth harmonic generation module 250 with a NLO crystal in an external cavity resonating only at the second fundamental frequency to generate the 183 nm light with summed frequency $5\omega_1+\omega_2$.

Frequency mixing module 260A is illustrated in FIG. 5A and operates in an analogous manner to the fifth harmonic generation module 250 shown in FIG. 3. The cavity comprising mirrors 503, 504, 505, 506 is resonant at the second fundamental frequency $\omega_2$. The fifth harmonic of the first fundamental frequency ($5\omega_1$) 251 generated from the fifth harmonic generation module 250 overlaps with the second fundamental light ($\omega_2$) inside the NLO crystal 509 with the beam waists approximately in or near NLO crystals 509. Lens (or lens set) 502 is configured for mode-matching the incoming beam to the fundamental mode of the cavity, which has at least one of its waists near the center of the NLO crystal 509. Lens or lens set 508 focuses the fifth harmonic light ($5\omega_1$) near the center of the NLO crystal 509. NLO crystal 509 sums the second fundamental frequency ($\omega_2$) and the fifth harmonic of the fundamental frequency ($5\omega_1$) to create the summed frequency ($5\omega_1+\omega_2$) with the corresponding wavelength in the range of 181 nm to 185 nm, i.e. approximately 183 nm. Mirror 506 reflects any unconsumed second fundamental light ($\omega_2$) 514A to the input coupler 503 so it circulates inside the cavity to enhance the power in the cavity. In the preferred embodiments, the two surfaces 521 and 522 of the NLO crystal 509 are cut at an angle near Brewster's angle relative to the polarization of the second fundamental light ($\omega_2$) 513A which is shown as the direction of arrow 529. One advantage of surfaces 521 and 522 being cut at an angle near Brewster's angle is that anti-reflection coatings are not needed on NLO 509 surfaces 521 and 522. Another advantage is that the incoming fifth harmonic light 251, the unconsumed fifth harmonic light 512A, and the generated 183 nm light 270A are separated from the second fundamental light 513A outside of the NLO crystal 509 due to chromatic dispersion of the NLO crystal. Furthermore, if the separations of fifth harmonic 251 from second fundamental 513A, and of unconsumed fifth harmonic 512A from unconsumed second fundamental 514A are large enough so that the mirrors 505 and 506 are not in the beam path of the beams 251, 512A and 270A so they only need to be coated for high reflectivity at the second fundamental frequency ($\omega_2$). This minimizes the coating degradation or damage when exposed to high power DUV light. Otherwise, in another embodiment, NLO crystal 509 with normal incidence may be implemented. If beam 251 is not separated far enough from the second fundamental beam 513A, then a beam splitter, dichroic mirror or prism (not shown) may be used in between the NLO crystal 509 and mirror 505 (or dichroic coating may be used on mirror 505) to pass the second fundamental light ($\omega_2$) 513A and direct the incoming fifth harmonic light ($5\omega_1$) 251 into NOL crystal 509. If beams 512A and 270A are not separated far enough from unconsumed second fundamental 514A, a beam splitter, dichroic mirror or prism (not shown) in between NLO crystal 509 and mirror 506 (or a dichroic coating on mirror 506) may be used to pass the unconsumed second fundamental light ($\omega_2$) 514A and divert the generated 183 nm light 270A at summed frequency ($5\omega_1+\omega_2$) and the unconsumed fifth harmonic ($5\omega_1$) 512A out of the cavity.

In some embodiments, instead of having a bow-tie cavity, other shapes of cavity such as a delta shape or a standing-wave cavity are used. If a standing-wave cavity is used, the summed frequency is generated in the same direction as the injected fifth harmonic light. As in prior art CW lasers, the cavity can be stabilized with standard PDH or HC locking techniques. The cavity length is adjusted to maintain resonance by adjusting the position of a mirror (such as the mirror 504 in FIG. 5A) or prism through a control signal (not shown) connected to a piezo-electric transducer (PZT), voice coil or other actuator.

Referring to FIG. 2B, in another embodiment laser 200B utilizes an intra-cavity frequency mixing module 260B for generating the 183 nm light at summed frequency ($5\omega_1+\omega_2$). FIGS. 5B and 5C show two alternative embodiments in which a (second) cavity of mixing module 260B (FIG. 2B) is implemented using either a solid state laser cavity (FIG. 5B) or an optical parametric oscillator cavity (FIG. 5C). In each case, the (second) cavity is configured to circulate (second) light (i.e., either second fundamental light in the case of the solid state laser cavity (FIG. 5B) or signal light in the case of the optical parametric oscillator cavity (FIG. 5C)). In both instances the circulated light has a frequency range with a corresponding wavelength in the range of approximately 1260 nm to approximately 1420 nm, and therefore the both the second fundamental frequency of the circulated light in FIG. 5B and the signal frequency of the circulated signal light in FIG. 5C are referenced using "$\omega_2$" for convenience.

A simplified diagram showing an intra-cavity frequency mixing module 260B1 using a solid state laser cavity is illustrated in FIG. 5B. Instead of using an external resonant cavity to enhance the second fundamental frequency and perform frequency mixing to generate the 183 nm light, NLO crystal 509 for sum frequency generation is placed inside a solid state laser cavity generating light at the second fundamental frequency $\omega_2$. As illustrated in FIG. 5B, the laser cavity generating the second fundamental frequency comprises input coupler 553, mirrors 554, 555, 566, gain medium 560 and additional elements such as the optical diode 561, etalon 562. Pump beam 234 with pump frequency ($\omega_p$) is generated from pump laser 204 referring to FIG. 2B, focused by one or more lenses 552 to approximately the center of the gain medium 560 and get absorbed. The second fundamental frequency ($\omega_2$) is generated through population inversion in both directions. To ensure single-direction traveling of the second fundamental light, an optical diode 561, which in some exemplary embodiments may comprise a wave plate and a Faraday rotator, is inserted in the cavity so initial light generation in the opposite direction cannot pass through and get amplified. An etalon and/or a birefringent filter 562 is placed in the beam path of the generated second fundamental light to select for the right bandwidth and avoid mode hopping in the cavity. Mirrors 553, 554, 555 and 556 are coated for high reflectivity for the second fundamental frequency so it circulates inside the cavity and does not leak out, in contrast to a typical laser cavity where an output coupler coated for partial transmission of the laser wavelength is implemented to let the beam out.

As illustrated in FIG. 5B, the NLO crystal 509 is inserted at a waist position in the beam path of the second fundamental light 513B in order to generate 183 nm light by sum frequency generation from the second fundamental frequency ($\omega_2$) and the fifth harmonic 251 (at frequency $5\omega_1$) generated from the fifth harmonic generation module 250. Lens or lens set 508 focuses the fifth harmonic 251 near the center of the NLO crystal 509. Mirror 506 reflects any unconsumed second fundamental light 514B to the input coupler 553 so it circulates inside the cavity to enhance power. In a preferred embodiment, the two surfaces 521 and 522 of the NLO crystal 509 are cut near Brewster's angle relative to the polarization of the second fundamental light 513B which is indicated by arrow 529. One advantage of surfaces 521 and 522 being cut at an angle near Brewster's angle is that anti-reflection coatings are not needed on the two surfaces 521 and 522 of NLO crystal 509. Another advantage is that the incoming fifth harmonic light 251, the unconsumed fifth harmonic 512B, and the generated 183 nm light 270B are separated from the second fundamental light 513B due to chromatic dispersion of the NLO crystal 509. Furthermore, if the separations of fifth harmonic 251 from second fundamental 513B, and of unconsumed fifth harmonic 512B from unconsumed second fundamental 514B are large enough so that the mirrors 555 and 556 are not in the beam path of the beam 251, 512B and 270B so they only need to be coated for high reflectivity at the second fundamental frequency ($\omega_2$). This minimizes the coating degradation or damage when exposed to high power DUV light. Otherwise, in another embodiment, NLO crystal 509 may be implemented with normal incidence. If beam 251 is not separated far enough from the second fundamental beam 513B, then a beam splitter, dichroic mirror or prism (not shown) may be used in between the NLO crystal 509 and mirror 555 (or dichroic coating may be used on mirror 555) to pass the second fundamental light 513B and direct the incoming fifth harmonic light 251 into NOL crystal 509. If beams 512B and 270B are not separated far enough from unconsumed second fundamental 514B, a beam splitter, dichroic mirror or prism (not shown) in between NLO crystal 509 and mirror 556 (or a dichroic coating on mirror 556) may be used to pass the unconsumed second fundamental light ($\omega_2$) 514B and divert the generated 183 nm light 270B at summed frequency ($5\omega_1+\omega_2$) and the unconsumed fifth harmonic 512B out of the cavity. In this embodiment, the frequency mixing module does not comprise an external cavity resonating at the second fundamental frequency, but a solid-state laser cavity generating the second fundamental frequency, so the cavity is less sensitive and active feedback control loops for controlling the cavity length may not be necessary.

In an alternative embodiment (not shown), the pump light may be focused to the gain medium 560 from the other side and pass through mirror 554 or come in from both directions at the same time. In some exemplary embodiments, the pumping for a Nd:YAG or a Nd:Vanadate laser can be done using one or more diode lasers operating at approximately 808 nm in wavelength or at approximately 888 nm in wavelength, while the pumping for an Er:YAG laser can be done with an Er-doped fiber laser operating at approximately 1532 nm.

An alternative embodiment 260B2 that may be used instead of 260B1 in FIG. 2B for intra-cavity generation of the 183 nm light at summed frequency ($5\omega_1+\omega_2$) is illustrated in FIG. 5C. Instead of placing NLO crystal 509 inside a solid state laser cavity generating light at the second fundamental frequency $\omega_2$ as illustrated in FIG. 5B and explained above, NLO crystal 509 is placed in an OPO cavity resonant at signal frequency $\omega_2$ and comprising mirrors 573, 574, 575 and 576 and NLO material 570 as illustrated in FIG. 5C. Pump beam 234 with pump frequency ($\omega_p$) is generated from pump laser 204 in FIG. 2B, focused by one or more lenses 572 to a focal point close to the center of the NLO material 570 and where it is down-converted to a signal frequency $\omega_2$ and an idler frequency (equal to $\omega_p-\omega_2$). Note that as used herein, signal frequency $\omega_2$ refers to the frequency that is desired for generating the 183 nm light 270B, regardless of whether the signal or the idler has the higher frequency (in contrast to the common convention where the signal frequency is higher than the idler frequency). Mirrors 573, 574, 575 and 576 are coated for high reflectivity for the signal frequency $\omega_2$ so that unconverted signal circulates inside the cavity to build up a high power density of the signal frequency inside the cavity. In one embodiment, precise frequency control of the signal frequency $\omega_2$ is implemented by actively controlling the optical path length of the cavity by an actuator attached to one of the mirrors, such as a piezoelectric transducer (PZT) or voice coil attached to mirror 576. In an alternative embodiment, frequency control of the signal frequency $\omega_2$ is achieved by a narrow-band reflective coating placed on one or more of the mirror surfaces, or by a narrow-band transmission or reflection element (not shown) placed in the cavity. The pump light is directed into the cavity through an input coupler, for example, by appropriate coatings on mirror 573, or by a separate input coupler (not shown) within the cavity. Unconsumed pump and the idler (together labeled as 578C) may exit the cavity through a wavelength selective coating on one mirror, such as mirror 574 as shown, or may be diverted out of the cavity by one or more optical elements such as a dichroic mirror or a beam splitter (not shown).

NLO material 570 is preferably a periodically poled non-linear optical crystal, such as periodically poled MgO-doped stoichiometric lithium tantalate (MgO:SLT) or periodically poled MgO-doped lithium niobate (MgO:LN). The poling period is chosen for quasi-phase matching of the pump frequency and the signal frequency. The pump laser may be any convenient laser that generates a pump frequency suitable for generating the signal frequency by down conversion. In one embodiment, the pump laser frequency $\omega_p$ is equal to the first fundamental frequency $\omega_1$. In one embodiment, first fundamental laser 201 in FIG. 2B may generate both the first fundamental light 211 and the pump light 234 when their frequencies are equal. In one embodiment, unconsumed pump light from OPO intra-cavity frequency mixing module 260B2 (i.e. light at the pump frequency within 578C) may be directed to other modules such as the fourth harmonic generation module or the fifth harmonic generation module when the first fundamental and pump frequencies are equal.

As illustrated in FIG. 5C, the NLO crystal 509 is inserted at a waist position in the beam path of the signal light 513B in order to generate 183 nm light 270B by sum frequency generation from the signal frequency ($\omega_2$) and the fifth harmonic ($5\omega_1$) 251 generated from the fifth harmonic generation module 250. Lens or lens set 508 focuses the fifth harmonic ($5\omega_1$) near the center of the NLO crystal 509. Mirror 576 reflects any unconsumed signal light 514C to mirror (input coupler) 573 so that it circulates inside the cavity to enhance power. In a preferred embodiment, the two surfaces 521 and 522 of the NLO crystal 509 are cut near Brewster's angle relative to the polarization of the signal light 513C which is indicated by arrow 529C. Advantages of surfaces 521 and 522 being cut at an angle near Brewster's angle are explained above. The unconsumed signal 514C and unconsumed fifth harmonic 512C may be separated from the 183 nm light 270B by any of the optical configurations described above in regards to FIGS. 2A and 2B.

Referring again to FIGS. 5A, 5B and 5C, in preferred embodiments the combination of walk-off and the angle of output surface of crystal 509 may achieve sufficient separation of the laser output 270A/270B from the other wavelengths such that no other optics are not required to further separate the desired output wavelength, i.e., the laser output light 270A/270B at approximately 183 nm, from the other unwanted wavelengths (e.g., unconsumed portions of fifth harmonic light 512A/512B/512C and/or leakage of the second fundamental or signal light). In some embodiments, it may use one or more optical elements outside of the cavity to further separate the desired output wavelength from the other unwanted wavelength. This optics may include a beam splitter, a prism, a grating, or other optical elements.

In preferred embodiments of FIGS. 5A, 5B and 5C, the non-linear crystal 509 comprises an annealed (deuterium-treated or hydrogen-treated) cesium lithium borate (CLBO) crystal and the annealed CLBO crystal is held at a constant temperature of approximately 30° C. or lower by way of a suitable temperature control system 330 (e.g., a thermoelectric cooler). In one embodiment, the temperature of non-linear crystal 509 may be lower than 0° C., for example, approximately −5° C. or −10° C. In other embodiments, the frequency mixing module 260A/260B may comprise a BBO or other non-linear crystal for frequency summing.

For type-I matching in CLBO at a temperature of approximately 30° C. with a second fundamental or signal wavelength near 1342 nm and a fifth harmonic having a wavelength near 209.4 nm, the phase-matching angle is approximately 79°. For type-I matching in CLBO at a temperature of approximately 30° C. with a second fundamental wavelength near 1300 nm and a fifth harmonic having a wavelength near 213 nm, the phase matching angle is approximately 81°. Both of these example show that nearly non-critical phase matching with high efficiency and low walk-off can be achieved for generating wavelengths near 183 nm. These wavelength combinations are merely examples and are not meant to limit the scope of the invention. One skilled in the appropriate arts understands how to choose different combinations of wavelengths, temperature and angle to achieve phase matching.

The above description and associated figures illustrate various lasers for generating light having a wavelength of approximately 183 nm. Some specific wavelengths and wavelength ranges are described in order to illustrate embodiments. Other laser embodiments similar to those described above that generate a different wavelength a few nm shorter or longer than 183 nm are possible and are within the scope of this invention.

Note that, in any of the embodiments, mirrors, prisms, periscopes etc. may be used to direct the fundamental or other wavelengths as needed. Prisms, beam splitters, beam combiners and dichroic-coated mirrors, for example, may be used to separate and combine beams as necessary. Various combinations of mirrors and beam splitters may be used to separate and route the various wavelengths between the different frequency conversion stages in any appropriate sequence. The faces of frequency conversion crystals, prisms, beam splitters or lenses may be cut at an angle approximately equal to Brewster's angle for an incident wavelength in order to minimize or control reflection without using an anti-reflection coating. This cutting can be particularly advantageous for those surfaces where UV radiation is incident, because anti-reflection coatings may degrade when exposed to UV and thus may degrade the reliability of the laser if used on such surfaces. Waveplates (including Brewster-angle waveplates or retarders) or other optical elements may be used to rotate the polarization of any of the wavelengths as needed to align the polarization with the appropriate crystal axis of the next frequency conversion or frequency mixing stage. The use of Brewster angle optics in DUV lasers is described in more detail in U.S. Pat. No. 8,711,470 entitled "High Damage Threshold Frequency Conversion System" to Armstrong. This patent is incorporated by reference herein.

Any of the frequency conversion stages may include one or more protective environments, such as those described in U.S. Pat. No. 8,298,335, entitled "Enclosure for controlling the environment of optical crystals", by Armstrong. This patent is incorporated by reference herein. Note that a single protective environment may enclose multiple stages or a single stage.

Any of the frequency conversion stages may incorporate any of the methods or systems described in U.S. Pat. Nos. 9,461,435 and 9,059,560, both entitled "Alleviation of laser-induced damage in optical materials by suppression of transient color centers formation and control of phonon population", to Dribinski et al., any of the apparatus or methods described in U.S. Pat. No. 8,824,514, entitled "Measuring crystal site lifetime in a non-linear optical crystal", by Armstrong, any of the apparatus and methods described in U.S. Pat. No. 8,976,343, entitled "Laser crystal degradation compensation" by Genis, any of the systems and methods described in U.S. Provisional Patent Application 61/837,053 entitled "Preferential shift direction to prolong the life and minimize perturbations of a scanning nonlinear optical crystal" and filed by Genis on Jun. 19, 2013, and any of the systems and methods described in U.S. Provisional Patent Applications 61/666,675 and 61/762,269, both entitled "Scan rate for continuous motion of a crystal in a frequency converted laser" and filed by Armstrong et al. on Jun. 29, 2012 and Feb. 7, 2013 respectively. All of these patents, applications and provisional applications are incorporated herein by reference.

Further note that any of the frequency conversion stages may advantageously use deuterium, hydrogen and/or fluorine doped or treated non-linear crystals. Such crystals may be created, processed or treated by any of the processes or methods described in U.S. Pat. No. 9,023,152 filed on Sep. 3, 2010 by Dribinski et al., or U.S. Pat. No. 9,250,178 filed on Jun. 5, 2012 by Chuang et al., or U.S. patent application Ser. No. 14/248,045 filed on Apr. 8, 2014 by Dribinski et al. These patents and applications are incorporated herein by reference. The doped or treated crystals may be particularly useful in those stages involving deep UV wavelengths, including the second frequency doubling module 230, the fifth harmonic generation module 250, and the frequency mixing modules 260A, 260B1 and 260B2.

The above-described figures are not meant to represent the actual physical layout of the components. The above-described figures show the main optical modules involved in the process, but do not show every optical element. One skilled in the appropriate arts would understand how to build the 183 nm laser from the above-described figures and their associated descriptions. It is to be understood that more or fewer optical components may be used to direct the light where needed. Lenses and/or curved mirrors may be used to focus the beam waist to foci of substantially circular or elliptical cross sections inside or proximate to the non-linear crystals where appropriate. Prisms, beam-splitters, gratings or diffractive optical elements may be used to steer or separate the different wavelengths at the outputs of each frequency conversion module or mixing module when needed. Prisms, coated mirrors, or other elements may be used to combine the different wavelengths at the inputs to the frequency conversion and mixing modules as appropriate. Beam splitters or coated mirrors may be used as appropriate to divide one wavelength into two beams. Filters may be used to block or separate undesired wavelengths at the output of any stage. Waveplates may be used to rotate the polarization as needed. Other optical elements may be used as appropriate. In some cases, it may be acceptable to allow unconsumed light from one frequency-conversion stage to pass to the next stage even though that light is not needed in the subsequent stage. This may be acceptable if the power density is low enough not to cause damage and if there is little interference with the desired frequency conversion process (for example because of no phase matching at the crystal angle or due to the polarization of the light). One skilled in the appropriate arts would understand the various tradeoffs and alternatives that are possible in the implementation of the 183 nm laser.

Although the present invention is described herein using various fundamental wavelengths that facilitate generating laser output light 270 at the desired wavelength from 181 nm to 185 nm, other wavelengths within a few nanometers can be generated using different fundamental wavelengths. Unless otherwise specified in the appended claims, such lasers and systems utilizing such lasers are considered within the scope of this invention.

Comparing to pulsed lasers, a CW light source has a constant power level, which avoids the peak power damage issues and also allows for images or data to be acquired continuously. Also, the bandwidth of the generated CW light is several orders of magnitude narrower than typical mode-locked lasers, so the design of the corresponding illumination or detection optical system could be much less complex with better performance and the system cost could be reduced.

CW lasers with wavelength in the sub-200 nm are not commercially available at sufficient power level or very unreliable. There have not been any prior-art for generating CW light in the wavelength range down to approximately 183 nm. The embodiments of the present invention generate shorter wavelength down to approximately 183 nm, therefore provide better sensitivity for detecting small particles and defects than longer wavelengths.

In addition to their shorter wavelength, the 183 nm CW lasers of the present invention have several advantages compared with 193 nm CW lasers. Compared with lasers that generate 193 nm as the sixth or eighth harmonic, the 183 nm lasers of the present invention have the advantage of using fundamental wavelengths that are readily available at power levels of tens of W. An advantage compared with lasers that generate 193 nm by mixing a fifth harmonic of the first fundamental frequency with second frequency is that frequency mixing module of the 183 nm laser is more efficient because CLBO is nearly non-critically phase matched for generating 183 nm from a fifth harmonic wavelength in the range of approximately 206 nm to approximately 214 nm. This allows more efficient conversion of the second fundamental frequency and the fifth harmonic of the first fundamental frequency into the final output and also makes the frequency mixing module more stable.

Furthermore, the overall system is more stable with much less noise. As described in the present invention, the cavity of fifth harmonic generation module is only resonant for the first fundamental frequency, not the fourth harmonic frequency, so noise from the cavity of the fourth harmonic generation module is not coupled to cavity of fifth harmonic generation module. Similarly, in one exemplary embodiment, the cavity of frequency mixing module is only resonant for the second fundamental frequency, not the fifth harmonic of the first fundamental frequency, so the noise from the cavity of the fifth harmonic generator is not coupled to the cavity of the frequency mixing module. The other embodiment of the frequency mixing module does not comprise an external cavity resonating at the second fundamental frequency, but a solid state laser cavity generating the second fundamental frequency, so the cavity is less sensitive and the active feedback control loops for the cavity length may not be necessary.

Moreover, some embodiments of the inventive lasers disclosed herein do not require DUV coating on any of the optical elements inside the cavity of the fifth harmonic generation module and the frequency mixing module. Coatings can have a short lifetime when exposed to intense DUV radiation. So the advantage of no coating is that it minimizes the damages due to the coatings and make high power DUV output more stable.

Another aspect of the invention is a wafer, reticle or photomask inspection or metrology system that incorporates the inventive 183 nm CW lasers. Aspects of such systems are illustrated in FIGS. 6 through 11.

Figure 6:
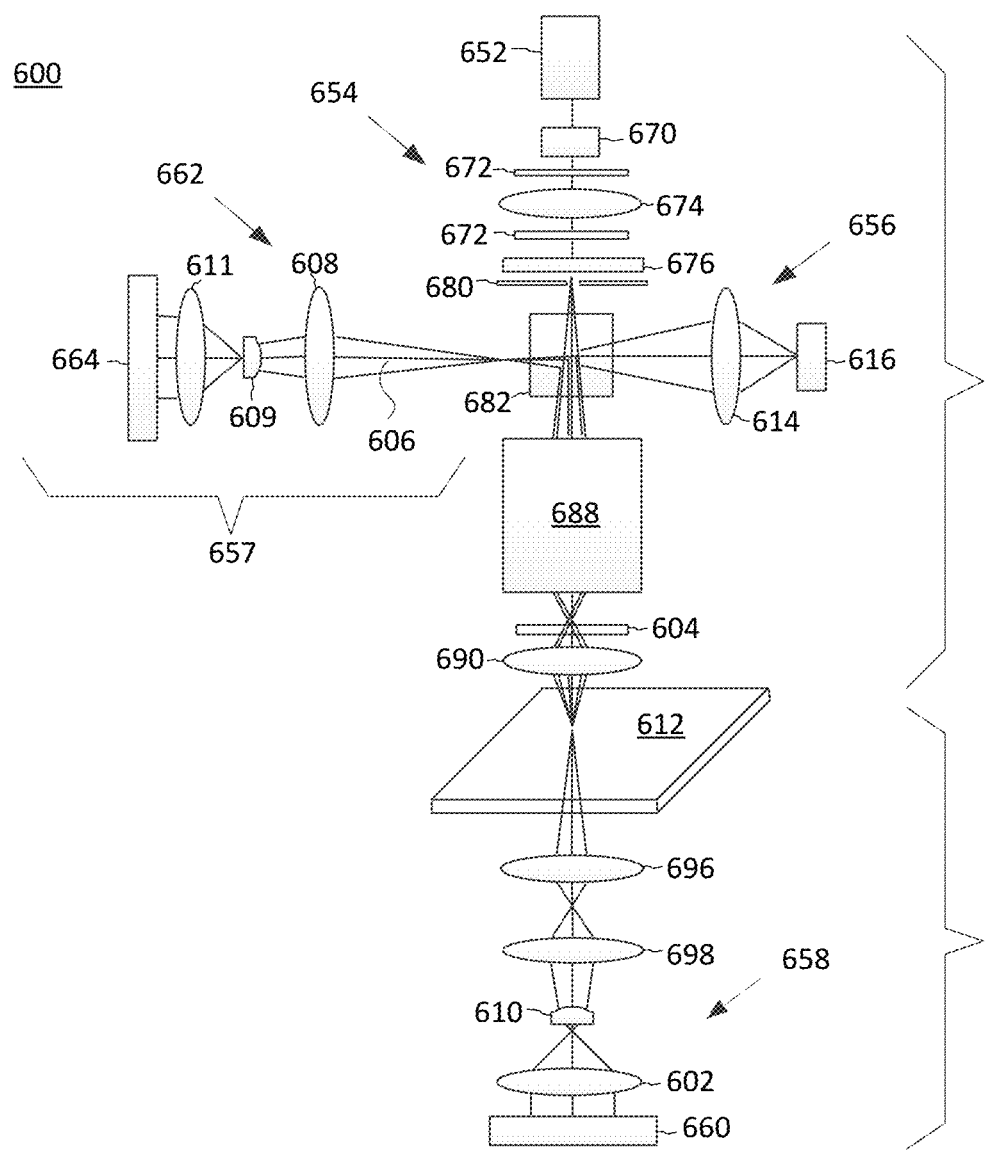
FIG. 6 is a simplified diagram showing an exemplary reticle or photomask inspection system utilizing the laser assemblies of FIGS. 2A and 2B in accordance with a specific embodiment of the present invention.

A reticle or photomask inspection system 600 may be configured to measure transmitted and reflected light from a substrate 612 such as a reticle or photomask as shown in FIG. 6 and described in U.S. Pat. No. 7,352,457, which is incorporated by reference as if fully set forth herein. For more details on reticle and photomask inspection systems that may use the inventive laser of this disclosure see also U.S. Pat. No. 5,563,702, which is incorporated by reference as if fully set forth herein. The reticle or photomask inspection system utilizing the inventive laser of this disclosure may simultaneously detect reflected and transmitted images from the reticle or photomask on a single detector as described in U.S. Pat. No. 7,528,943 by Brown et al. This patent is incorporated by reference as if fully set forth herein.

System 600 generally includes a first optical arrangement 651 and a second optical arrangement 657. As shown, first optical arrangement 651 includes at least a light source 652, inspection optics 654, and reference optics 656, while the second optical arrangement 657 includes at least transmitted light optics 658, transmitted light detectors 660, reflected light optics 662, and reflected light detectors 664. In one preferred configuration, light source 652 includes one of the above-described improved lasers.

Light source 652 is configured to emit a light beam that passes through an acousto-optic device 670, which is arranged for deflecting and focusing the light beam. Acousto-optic device 670 may include a pair of acousto-optic elements, e.g. an acousto-optic pre-scanner and an acousto-optic scanner, which deflect the light beam in the Y-direction and focus it in the Z-direction. By way of example, most acousto-optic devices operate by sending an RF signal to quartz or a crystal such as $TeO_2$. This RF signal causes a sound wave to travel through the crystal. Because of the travelling sound wave, the crystal becomes asymmetric, which causes the index of refraction to change throughout the crystal. This change causes incident beams to form a focused travelling spot which is deflected in an oscillatory fashion.

When the light beam emerges from acousto-optic device 670, it then passes through a pair of quarter wave plates 672 and a relay lens 674. Relay lens 674 is arranged to collimate the light beam. The collimated light beam then continues on its path until it reaches a diffraction grating 676. Diffraction grating 676 is arranged for flaring out the light beam, and more particularly for separating the light beam into three distinct beams, which are spatially distinguishable from one another (i.e. spatially distinct). In most cases, the spatially distinct beams are also arranged to be equally spaced apart and have substantially equal light intensities.

Upon leaving the diffraction grating 676, the three beams pass through an aperture 680 and then continue until they reach a beam splitter cube 682. Beam splitter cube 682 (in combination with the quarter wave plates 672) is arranged to divide the beams into two paths, i.e. one directed downward and the other directed to the right (in the configuration shown in FIG. 6). The path directed downward is used to distribute a first light portion of the beams to substrate 612, whereas the path directed to the right is used to distribute a second light portion of the beams to reference optics 656. In most embodiments, most of the light is distributed to substrate 612 and a small percentage of the light is distributed to reference optics 656, although the percentage ratios may vary according to the specific design of each optical inspection system. In one embodiment, reference optics 656 can include a reference collection lens 614 and a reference detector 616. Reference collection lens 614 is arranged to collect and direct the portion of the beams on reference detector 616, which is arranged to measure the intensity of the light. Reference optics are generally well known in the art and for the sake of brevity will not be discussed in detail.

The three beams directed downward from beam splitter 682 are received by a telescope 688, which includes several lens elements that redirect and expand the light. In one embodiment, telescope 688 is part of a telescope system that includes a plurality of telescopes rotating on a turret. For example, three telescopes may be used. The purpose of these telescopes is to vary the size of the scanning spot on the substrate and thereby allow selection of the minimum detectable defect size. More particularly, each of the telescopes generally represents a different pixel size. As such, one telescope may generate a larger spot size making the inspection faster and less sensitive (e.g., low resolution), while another telescope may generate a smaller spot size making inspection slower and more sensitive (e.g., high resolution).

From telescope 688, the three beams pass through an objective lens 690, which is arranged for focusing the beams onto the surface of substrate 612. As the beams intersect the surface as three distinct spots, both reflected light beams and transmitted light beams may be generated. The transmitted light beams pass through substrate 612, while the reflected light beams reflect off the surface. By way of example, the reflected light beams may reflect off of opaque surfaces of the substrate, and the transmitted light beams may transmit through transparent areas of the substrate. The transmitted light beams are collected by transmitted light optics 658 and the reflected light beams are collected by reflected light optics 662.

With regards to transmitted light optics 658, the transmitted light beams, after passing through substrate 612, are collected by a first transmitted lens 696 and focused with the aid of a spherical aberration corrector lens 698 onto a transmitted prism 610. Prism 610 can be configured to have a facet for each of the transmitted light beams that are arranged for repositioning and bending the transmitted light beams. In most cases, prism 610 is used to separate the beams so that they each fall on a single detector in transmitted light detector arrangement 660 (shown as having three distinct detectors). Accordingly, when the beams leave prism 610, they pass through a second transmitted lens 602, which individually focuses each of the separated beams onto one of the three detectors, each of which is arranged for measuring the intensity of the transmitted light.

With regards to reflected light optics 662, the reflected light beams after reflecting off of substrate 612 are collected by objective lens 690, which then directs the beams towards telescope 688. Before reaching telescope 688, the beams also pass through a quarter wave plate 604. In general terms, objective lens 690 and telescope 688 manipulate the collected beams in a manner that is optically reverse in relation to how the incident beams are manipulated. That is, objective lens 690 re-collimates the beams, and telescope 688 reduces their size. When the beams leave telescope 688, they continue (backwards) until they reach beam splitter cube 682. Beam splitter 682 is configured to work with quarter wave-plate 604 to direct the beams onto a central path 606.

The beams continuing on path 606 are then collected by a first reflected lens 608, which focuses each of the beams onto a reflected prism 609, which includes a facet for each of the reflected light beams. Reflected prism 609 is arranged for repositioning and bending the reflected light beams.

Similar to transmitted prism 610, reflected prism 609 is used to separate the beams so that they each fall on a single detector in the reflected light detector arrangement 664. As shown, reflected light detector arrangement 664 includes three individually distinct detectors. When the beams leave reflected prism 609, they pass through a second reflected lens 611, which individually focuses each of the separated beams onto one of these detectors, each of which is arranged for measuring the intensity of the reflected light.

There are multiple inspection modes that can be facilitated by the aforementioned optical assembly. By way of example, the optical assembly can facilitate a transmitted light inspection mode, a reflected light inspection mode, and a simultaneous inspection mode. With regards to the transmitted light inspection mode, transmission mode detection is typically used for defect detection on substrates such as conventional optical masks having transparent areas and opaque areas. As the light beams scan the mask (or substrate 612), the light penetrates the mask at transparent points and is detected by the transmitted light detectors 660, which are located behind the mask and which measure the intensity of each of the light beams collected by transmitted light optics 658 including first transmitted lens 696, second transmitted lens 602, spherical aberration lens 698, and prism 610.

With regards to the reflected light inspection mode, reflected light inspection can be performed on transparent or opaque substrates that contain image information in the form of chromium, developed photoresist or other features. Light reflected by the substrate 612 passes backwards along the same optical path as inspection optics 654, but is then diverted by a polarizing beam splitter 682 into detectors 664. More particularly, first reflected lens 608, prism 609, and second reflected lens 611 project the light from the diverted light beams onto detectors 664. Reflected light inspection may also be used to detect contamination on top of opaque substrate surfaces.

With regards to the simultaneous inspection mode, both transmitted light and reflected light are utilized to determine the existence and/or type of a defect. The two measured values of the system are the intensity of the light beams transmitted through substrate 612 as sensed by transmitted light detectors 660 and the intensity of the reflected light beams as detected by reflected light detectors 664. Those two measured values can then be processed to determine the type of defect, if any, at a corresponding point on substrate 612.

More particularly, simultaneous transmitted and reflected detection can disclose the existence of an opaque defect sensed by the transmitted detectors while the output of the reflected detectors can be used to disclose the type of defect. As an example, either a chrome dot or a particle on a substrate may both result in a low transmitted light indication from the transmission detectors, but a reflective chrome defect may result in a high reflected light indication and a particle may result in a lower reflected light indication from the same reflected light detectors. Accordingly, by using both reflected and transmitted detection one may locate a particle on top of chrome geometry which could not be done if only the reflected or transmitted characteristics of the defect were examined. In addition, one may determine signatures for certain types of defects, such as the ratio of their reflected and transmitted light intensities. This information can then be used to automatically classify defects.

Figure 7:
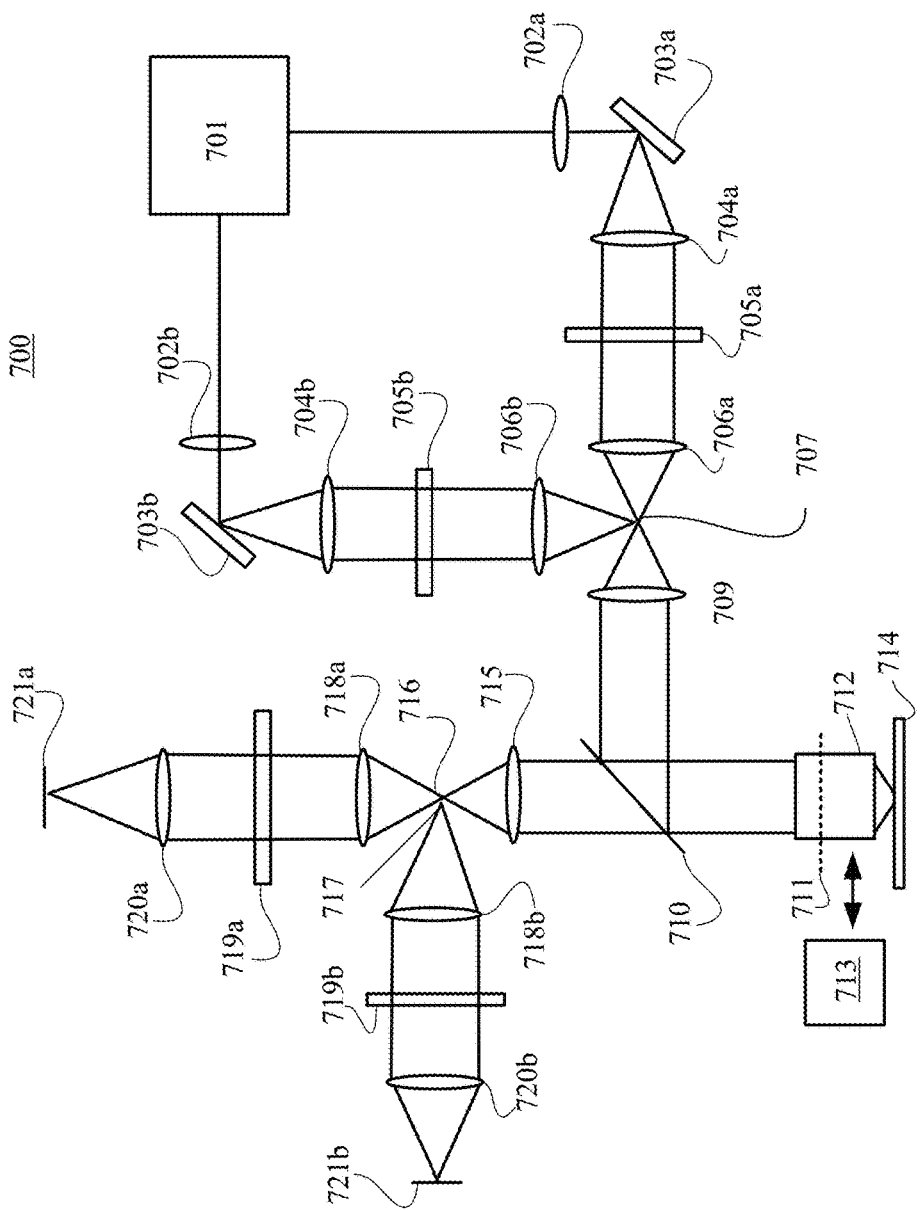
FIG. 7 is a simplified diagram showing an exemplary multiple objective inspection system utilizing the laser assemblies of FIGS. 2A and 2B in accordance with another specific embodiment of the present invention.

This laser may be used as one of the light sources in an inspection system that has multiple light sources covering different wavelengths or wavelength ranges with different objectives optimized for different wavelength ranges such as system 700 shown in FIG. 7. Such an inspection system is described in US Published Application 2009/0180176, which is incorporated by reference as if fully set forth herein.

In system 700, illumination from a laser source 701 is sent to multiple sections of the illumination subsystem. A first section of the illumination subsystem includes elements 702a through 706a. Lens 702a focuses light from laser 701. Light from lens 702a then reflects from mirror 703a. Mirror 703a is placed at this location for the purposes of illustration, and may be positioned elsewhere. Light from mirror 703a is then collected by lens 704a, which forms illumination pupil plane 705a. An aperture, filter, or other device to modify the light may be placed in pupil plane 705a depending on the requirements of the inspection mode. Light from pupil plane 705a then passes through lens 706a and forms illumination field plane 707.

A second section of the illumination subsystem includes elements 702b through 706b. Lens 702b focuses light from laser 701. Light from lens 702b then reflects from mirror 703b. Light from mirror 703b is then collected by lens 704b which forms illumination pupil plane 705b. An aperture, filter, or other device to modify the light may be placed in pupil plane 705b depending on the requirements of the inspection mode. Light from pupil plane 705b then passes through lens 706b and forms illumination field plane 707. The light from the second section is then redirected by mirror or reflective surface such that the illumination field light energy at illumination field plane 707 is comprised of the combined illumination sections.

Field plane light is then collected by lens 709 before reflecting off a beamsplitter 710. Lenses 706a and 709 form an image of first illumination pupil plane 705a at objective pupil plane 711. Likewise, lenses 706b and 709 form an image of second illumination pupil plane 705b at objective pupil plane 711. An objective 712 (or alternatively 713) then takes the pupil light and forms an image of illumination field 707 at sample 714. Objective 712 or objective 713 can be positioned in proximity to sample 714. Sample 714 can move on a stage (not shown), which positions the sample in the desired location. Light reflected and scattered from the sample 714 is collected by the high NA catadioptric objective 712 or objective 713. After forming a reflected light pupil at objective pupil plane 711, light energy passes beamsplitter 710 and lens 715 before forming an internal field 716 in the imaging subsystem. This internal imaging field is an image of sample 714 and correspondingly illumination field 707. This field may be spatially separated into multiple fields corresponding to the illumination fields. Each of these fields can support a separate imaging mode.

One of these fields can be redirected using mirror 717. The redirected light then passes through lens 1018b before forming another imaging pupil 719b. This imaging pupil is an image of pupil 711 and correspondingly illumination pupil 705b. An aperture, filter, or other device to modify the light may be placed in pupil plane 719b depending on the requirements of the inspection mode. Light from pupil plane 719b then passes through lens 1020b and forms an image on sensor 721b. In a similar manner, light passing by mirror or reflective surface 717 is collected by lens 718a and forms imaging pupil 719a. Light from imaging pupil 719a is then collected by lens 720a before forming an image on detector 721a. Light imaged on detector 721a can be used for a different imaging mode from the light imaged on sensor 721b.

The illumination subsystem employed in system 700 is composed of laser source 701, collection optics 702-704, beam shaping components placed in proximity to a pupil plane 705, and relay optics 706 and 709. An internal field plane 707 is located between lenses 706 and 709. In one preferred configuration, laser source 701 can include one of the above-described improved lasers.

With respect to laser source 701, while illustrated as a single uniform block having two points or angles of transmission, in reality this represents a laser source able to provide two channels of illumination, for example a first channel of light energy such as laser light energy at a first frequency which passes through elements 702a-706a, and a second channel of light energy such as laser light energy at a second frequency which passes through elements 702b-706b. Different light illumination modes may be employed, such as bright field illumination in one channel and a dark field mode in the other channel.

While light energy from laser source 701 is shown to be emitted 90 degrees apart, and the elements 702a-706a and 702b-706b are oriented at 90 degree angles, in reality light may be emitted at various orientations, not necessarily in two dimensions, and the components may be oriented differently than as shown. FIG. 7 is therefore simply a representation of the components employed and the angles or distances shown are not to scale nor specifically required for the design.

Elements placed in proximity to pupil plane 705 may be employed in the current system using the concept of aperture shaping. Using this design, uniform illumination or near uniform illumination may be realized, as well as individual point illumination, ring illumination, quadrupole illumination, or other desirable patterns.

Various implementations for the objectives may be employed in a general imaging subsystem. A single fixed objective may be used. The single objective may support all the desired imaging and inspection modes. Such a design is achievable if the imaging system supports a relatively large field size and relatively high numerical aperture. Numerical aperture can be reduced to a desired value by using internal apertures placed at the pupil planes 705a, 705b, 719a, and 719b.

Multiple objectives may also be used as shown in FIG. 7. For example, although two objectives 712 and 713 are shown, any number is possible. Each objective in such a design may be optimized for each wavelength produced by laser source 701. These objectives 712 and 713 can either have fixed positions or be moved into position in proximity to the sample 714. To move multiple objectives in proximity to the sample, rotary turrets may be used as are common on standard microscopes. Other designs for moving objectives in proximity of a sample are available, including but not limited to translating the objectives laterally on a stage, and translating the objectives on an arc using a goniometer. In addition, any combination of fixed objectives and multiple objectives on a turret can be achieved in accordance with the present system.

The maximum numerical apertures of this configuration may approach or exceed 0.97, but may in certain instances be higher. The wide range of illumination and collection angles possible with this high NA catadioptric imaging system, combined with its large field size allows the system to simultaneously support multiple inspection modes. As may be appreciated from the previous paragraphs, multiple imaging modes can be implemented using a single optical system or machine in connection with the illumination device. The high NA disclosed for illumination and collection permits the implementation of imaging modes using the same optical system, thereby allowing optimization of imaging for different types of defects or samples.

The imaging subsystem also includes intermediate image forming optics 715. The purpose of the image forming optics 715 is to form an internal image 716 of sample 714. At this internal image 716, a mirror 717 can be placed to redirect light corresponding to one of the inspection modes. It is possible to redirect the light at this location because the light for the imaging modes are spatially separate. The image forming optics 718 (718a and 718b) and 720 (720a and 720b) can be implemented in several different forms including a varifocal zoom, multiple afocal tube lenses with focusing optics, or multiple image forming mag tubes.

Figure 8:
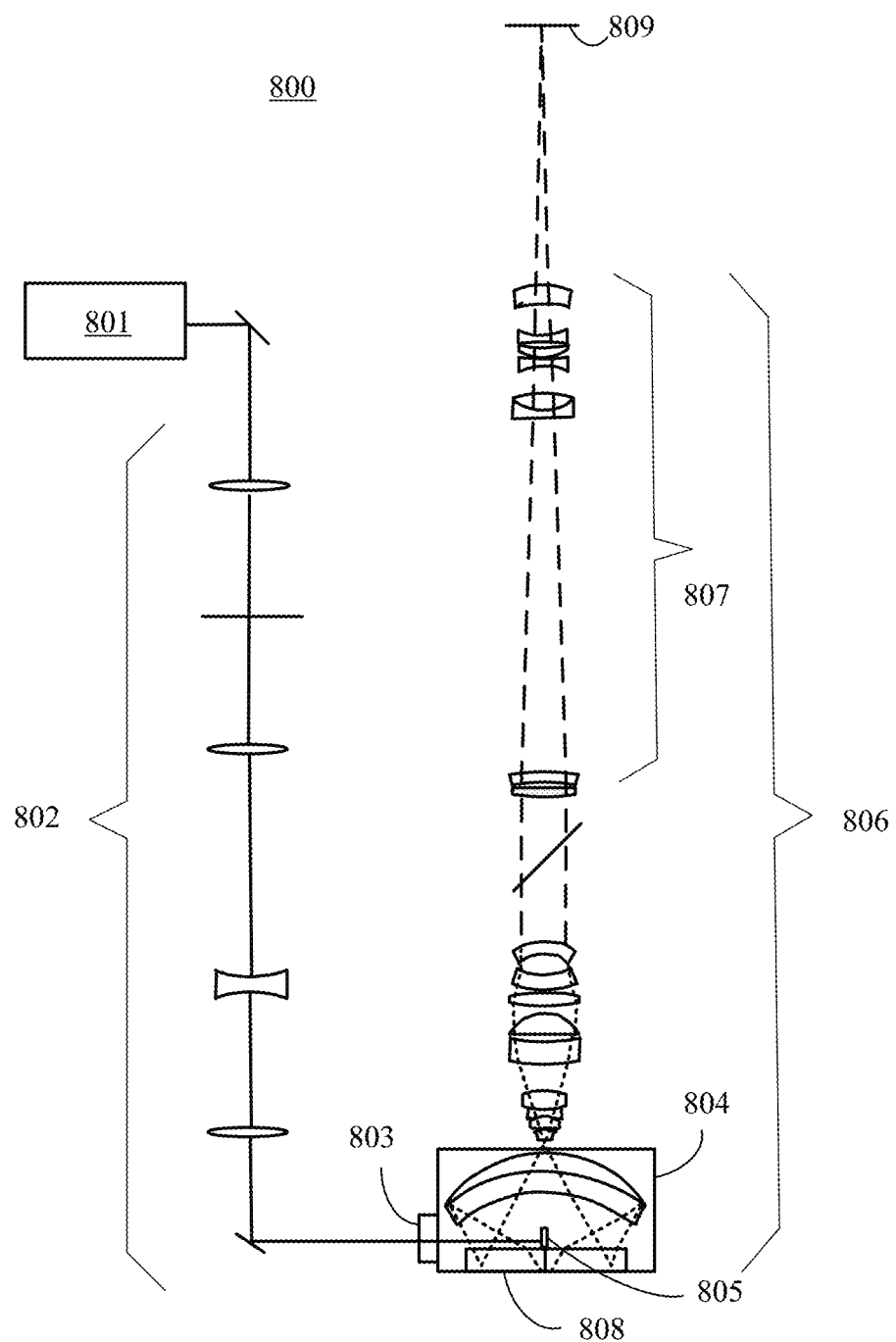
FIG. 8 is a simplified diagram showing an exemplary inspection system with dark-field and bright field inspection modes that utilizes the laser assemblies of FIGS. 2A and 2B in accordance with another specific embodiment of the present invention.

This laser may be used in an inspection system with dark-field and bright-field inspection modes as shown in FIG. 8. This figure and the system are explained in Published US Application 2007/0002465, which is incorporated by reference as if fully set forth herein. FIG. 8 illustrates a catadioptric imaging system 800 incorporating normal incidence laser illumination. The illumination block of system 800 includes a laser 801, adaptation optics 802 to control the illumination beam size and profile on the surface being inspected, an aperture and window 803 in a mechanical housing 804, and a prism 805 to redirect the laser along the optical axis at normal incidence to the surface of a sample 808. Prism 805 also directs the specular reflection from surface features of sample 808 and reflections from the optical surfaces of an objective 806 along the optical path to an image plane 809. Lenses for objective 806 can be provided in the general form of a catadioptric objective, a focusing lens group, and a zooming tube lens section 807. In a preferred embodiment, laser 801 can be implemented by the one of above-described improved lasers.

Figure 9A:
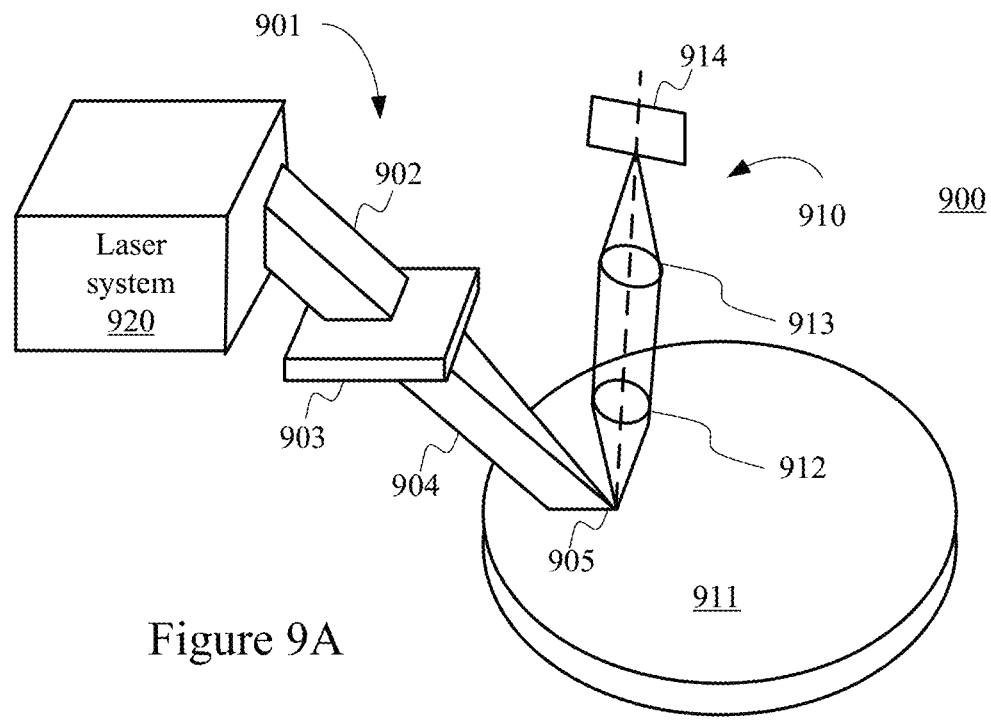
FIGS. 9A and 9B illustrates dark-field inspection systems utilizing the laser assemblies of FIGS. 2A and 2B in accordance with another specific embodiment of the present invention.
Figure 9B:
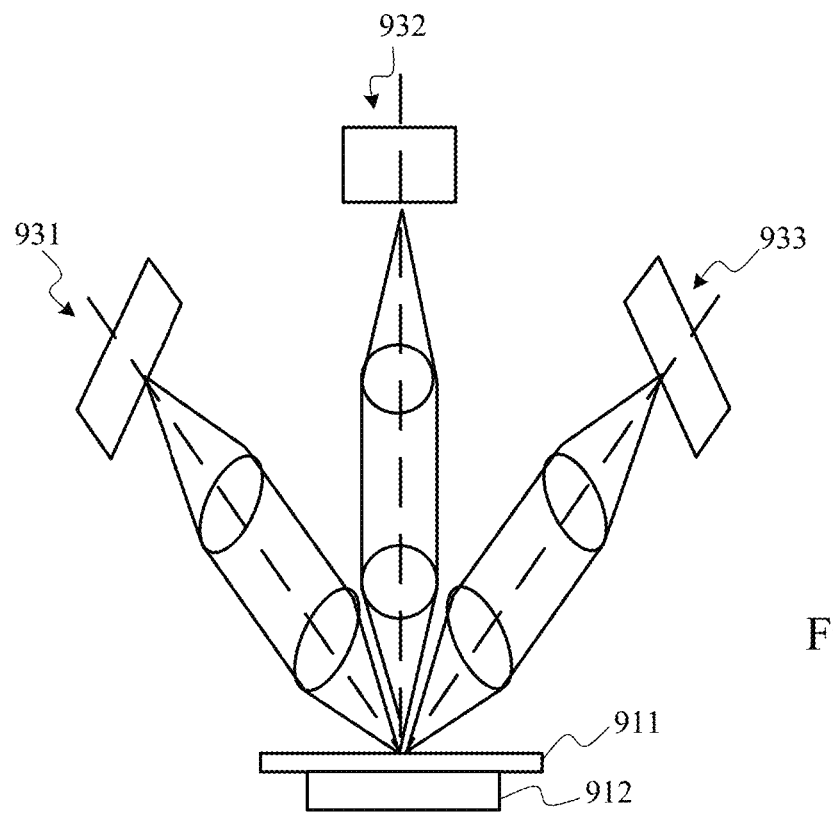

This laser may be used in a dark-field inspection system with oblique line illumination as shown in FIGS. 9A and 9B. This inspection system may have 2 or 3 different collection systems including off axis and near normal collection as shown. This dark field inspection system may also include normal incidence line illumination (not shown). More details including an explanation of the system shown in FIGS. 9A and 9B can be found in U.S. Pat. No. 7,525,649, which is incorporated by reference as if fully set forth herein.

FIG. 9A illustrates a surface inspection apparatus 900 that includes illumination system 901 and collection system 910 for inspecting areas of surface 911. As shown in FIG. 9A, a laser system 920 directs a light beam 902 through beam shaping optics 903. In a preferred embodiment, the laser system 920 includes one of the above described lasers. First beam shaping optics 903 can be configured to receive a beam from the laser system, which is focused onto surface 911.

Beam shaping optics 903 is oriented so that its principal plane is substantially parallel to a sample surface 911 and, as a result, illumination line 905 is formed on surface 911 in the focal plane of beam shaping optics 903. In addition, light beam 902 and focused beam 904 are directed at a non-orthogonal angle of incidence to surface 911. In particular, light beam 902 and focused beam 904 may be directed at an angle between about 1° and about 85° from a normal direction to surface 911. In this manner, illumination line 905 is substantially in the plane of incidence of focused beam 904.

Collection system 910 includes lens 912 for collecting light scattered from illumination line 905 and lens 913 for focusing the light coming out of lens 912 onto a device, such as charge coupled device (CCD) 914, comprising an array of light sensitive detectors. In one embodiment, CCD 914 may include a linear array of detectors. In such cases, the linear array of detectors within CCD 914 can be oriented parallel to illumination line 905. In one embodiment, multiple collection systems can be included, wherein each of the collection systems includes similar components, but differ in orientation.

For example, FIG. 9B illustrates an exemplary array of collection systems 931, 932, and 933 for a surface inspection apparatus (wherein its illumination system, e.g. similar to that of illumination system 901, is not shown for simplicity). First optics in collection system 931 collect light scattered in a first direction from the surface of sample 911. Second optics in collection system 932 collect light scattered in a second direction from the surface of sample 911. Third optics in collection system 933 collect light scattered in a third direction from the surface of sample 911. Note that the first, second, and third paths are at different angles of reflection to said surface of sample 911. A platform 912 supporting sample 911 can be used to cause relative motion between the optics and sample 911 so that the whole surface of sample 911 can be scanned.

Figure 10:
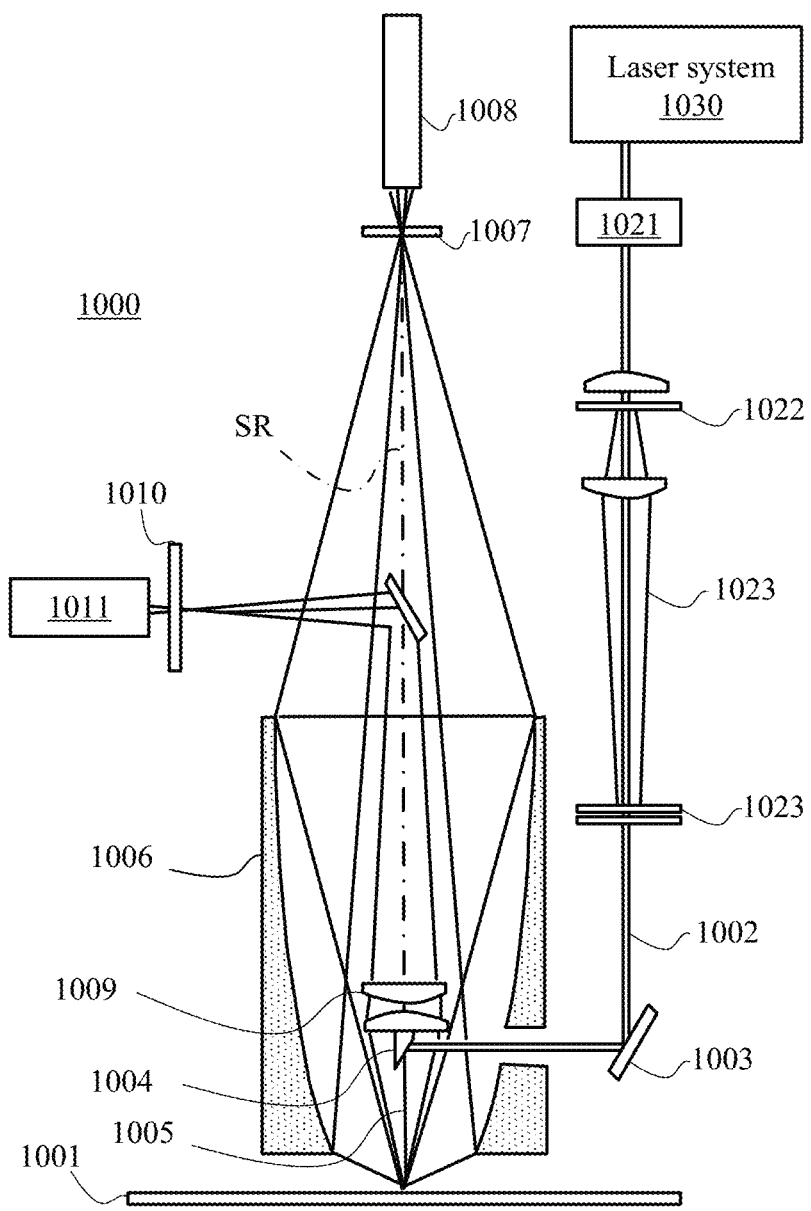
FIG. 10 is a simplified diagram showing an exemplary surface inspection system for unpatterned wafers utilizing the laser assemblies of FIGS. 2A and 2B in accordance with another specific embodiment of the present invention.
Figure 11:
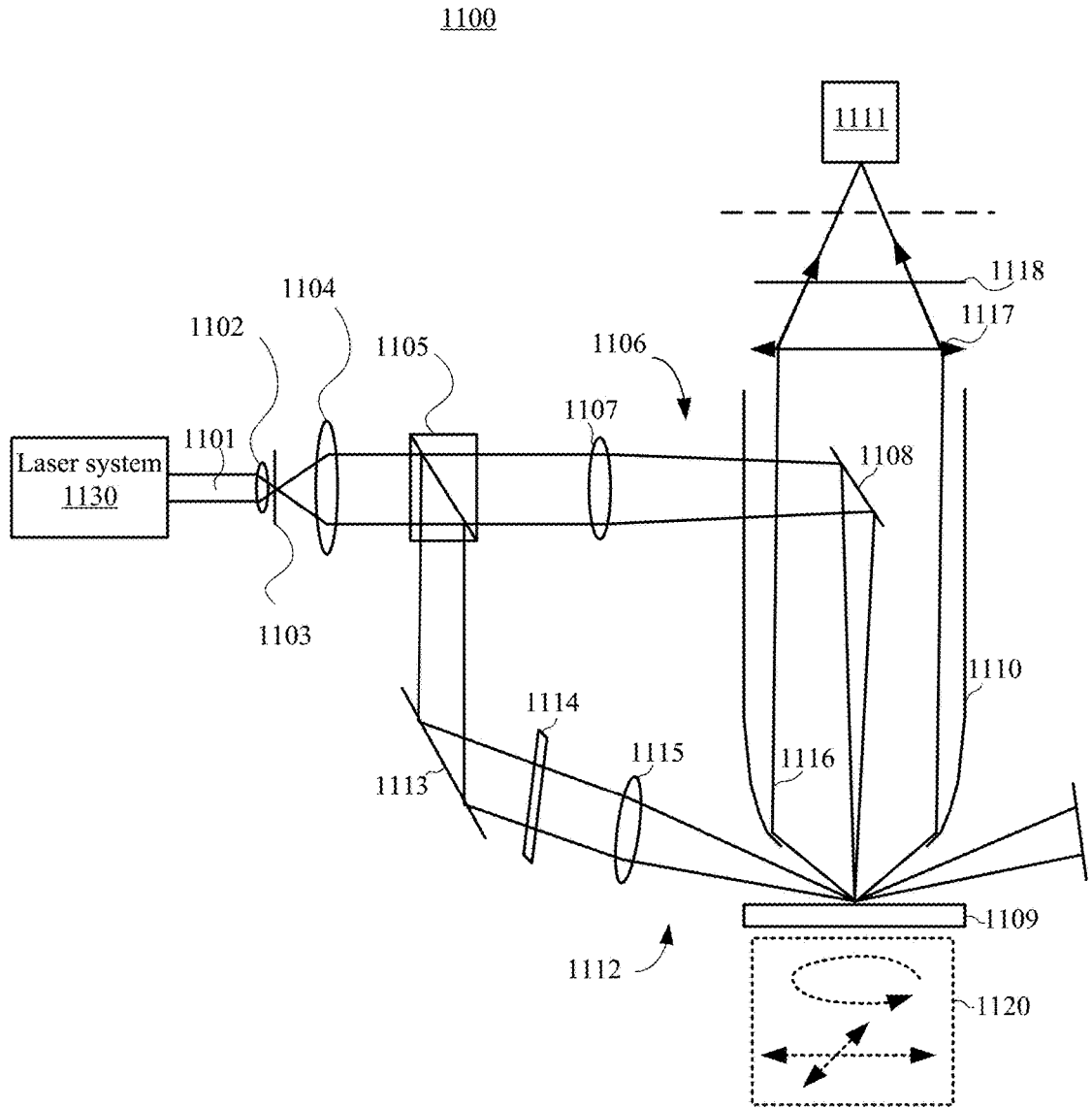
FIG. 11 is a simplified diagram showing an exemplary inspection system configured to implement anomaly detection using both normal and oblique illumination beams that utilizes the laser assemblies of FIGS. 2A and 2B in accordance with another specific embodiment of the present invention.

This laser may also be used in inspection systems for unpatterned wafers such as those shown in FIGS. 10 and 11. Such an inspection system may incorporate oblique and/or normal incidence illumination and a large collection solid angle for the scattered light as shown in these figures. More details on unpatterned wafer inspection systems and explanations of the elements of FIGS. 10 and 11 can be found in U.S. Pat. Nos. 6,201,601 and 6,271,916, both of which are incorporated by reference as if fully set forth herein.

FIG. 10 illustrates a surface inspection system 1000 that can be used for inspecting anomalies on a surface 1001. In this embodiment, surface 1001 can be illuminated by a substantially stationary illumination device portion of a laser system 1030 comprising a laser beam generated by one of the above-described improved lasers. The output of laser system 1030 can be consecutively passed through polarizing optics 1021, a beam expander and aperture 1022, and beam-forming optics 1023 to expand and focus the beam.

The resulting focused laser beam 1002 is then reflected by a beam folding component 1003 and a beam deflector 1004 to direct the beam 1005 towards surface 1001 for illuminating the surface. In the preferred embodiment, beam 1005 is substantially normal or perpendicular to surface 1001, although in other embodiments beam 1005 may be at an oblique angle to surface 1001.

In one embodiment, beam 1005 is substantially perpendicular or normal to surface 1001 and beam deflector 1004 reflects the specular reflection of the beam from surface 1001 towards beam turning component 1003, thereby acting as a shield to prevent the specular reflection from reaching the detectors. The direction of the specular reflection is along line SR, which is normal to the surface 1001 of the sample. In one embodiment where beam 1005 is normal to surface 1001, this line SR coincides with the direction of illuminating beam 1005, where this common reference line or direction is referred to herein as the axis of inspection system 1000. Where beam 1005 is at an oblique angle to surface 1001, the direction of specular reflection SR would not coincide with the incoming direction of beam 1005; in such instance, the line SR indicating the direction of the surface normal is referred to as the principal axis of the collection portion of inspection system 1000.

Light scattered by small particles is collected by mirror 1006 and directed towards aperture 1007 and detector 1008. Light scattered by large particles is collected by lenses 1009 and directed towards aperture 1010 and detector 1011. Note that some large particles will scatter light that is also collected and directed to detector 1008, and similarly some small particles will scatter light that is also collected and directed to detector 1011, but such light is of relatively low intensity compared to the intensity of scattered light that the respective detector is designed to detect. In one embodiment, detector 1011 can include an array of light sensitive elements, wherein each light sensitive element of the array of light sensitive elements is configured to detect a corresponding portion of a magnified image of the illumination line. In one embodiment, inspection system can be configured for use in detecting defects on unpatterned wafers.

FIG. 11 illustrates an inspection system 1100 configured to implement anomaly detection using both normal and oblique illumination beams. In this configuration, a laser system 1130, which includes one of the above-described improved lasers, can provide a laser beam 1101. A lens 1102 focuses the beam 1101 through a spatial filter 1103 and lens 1104 collimates the beam and conveys it to a polarizing beam splitter 1105. Beam splitter 1105 passes a first polarized component to the normal illumination channel and a second polarized component to the oblique illumination channel, where the first and second components are orthogonal. In the normal illumination channel 1106, the first polarized component is focused by optics 1107 and reflected by mirror 1108 towards a surface of a sample 1109. The radiation scattered by sample 1109 is collected and focused by a paraboloidal mirror 1110 to a photomultiplier tube 1111.

In the oblique illumination channel 1112, the second polarized component is reflected by beam splitter 1105 to a mirror 1113 which reflects such beam through a half-wave plate 1114 and focused by optics 1115 to sample 1109. Radiation originating from the oblique illumination beam in the oblique channel 1112 and scattered by sample 1109 is also collected by paraboloidal mirror 1110 and focused to detector 1111. In some embodiments, detector 1111 comprises one of a photomultiplier tube, a linear array detector and an image-intensified linear array detector. Note that detector 1111 has an aperture at its entrance. The aperture and the illuminated spot or line (from the normal and oblique illumination channels on surface 1109) are preferably at the foci of the paraboloidal mirror 1110.

The paraboloidal mirror 1110 collimates the scattered radiation from sample 1109 into a collimated beam 1116. Collimated beam 1116 is then focused by an objective 1117 and through an analyzer 1118 to the detector 1111. Note that curved mirrored surfaces having shapes other than paraboloidal shapes may also be used. An instrument 1120 can provide relative motion between the beams and sample 1109 so that the beams are scanned across the surface of sample 1109.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. An inspection system comprising:
   a laser assembly configured to generate continuous wave (CW) laser output light having a wavelength in the range of approximately 181 nm to approximately 185 nm;
   first optics configured to direct the laser output light from the laser assembly to an article being inspected;

second optics configured to collect an image information portion of said laser output light affected by the article being inspected, and to direct the image information portion to one or more detectors,
wherein the laser assembly comprises:
a first fundamental CW laser configured to generate a first fundamental CW light having a first fundamental frequency with a corresponding first fundamental wavelength between about 1 µm and 1.1 µm;
a fourth harmonic generation module coupled to receive a first portion of the first fundamental CW light, and configured to generate a fourth harmonic light having a fourth harmonic frequency equal to four times the first fundamental frequency;
a fifth harmonic generation module coupled to receive a second portion of the first fundamental CW light and to receive said fourth harmonic light from the fourth harmonic generation module, said fifth harmonic generation module being configured to generate a fifth harmonic light having a fifth harmonic frequency equal to five times the first fundamental frequency by mixing said fourth harmonic light and said second portion of the first fundamental CW light;
a frequency mixing module configured to generate said laser output light by mixing said fifth harmonic light with a second CW light having a second frequency with a corresponding second wavelength between 1.26 µm and 1.82 µm,
wherein the fifth harmonic generation module comprises a first cavity and a first nonlinear crystal, said first cavity being formed by a plurality of first mirrors that are configured to circulate the second portion of the first fundamental CW light such that circulated said first fundamental CW light passes through the first nonlinear crystal, said first nonlinear crystal being configured to mix said circulated first fundamental CW light with said fourth harmonic light received directly from said fourth harmonic generator to generate said fifth harmonic light,
wherein the frequency mixing module comprises a second cavity and a second nonlinear crystal, said second cavity being formed by a plurality of second mirrors that are configured to circulate the second CW light such that the circulated second CW light passes through the second nonlinear crystal, and the second nonlinear crystal being configured to receive said fifth harmonic light directly from said fifth harmonic generator such that said fifth harmonic light mixes with said circulated second CW light to generate said laser output light, and
wherein at least one of the first and second nonlinear crystals comprises one of an annealed cesium lithium borate (CLBO) crystal, a hydrogen-treated CLBO crystal and a deuterium-treated CLBO crystal.

2. The inspection system of claim 1, wherein the laser assembly further comprises a second fundamental laser configured to generate the second CW light at a first power level,
wherein the frequency mixing module is configured to receive the second CW light from the second fundamental laser such that the second CW light is circulated in the second cavity, and the second cavity is configured to resonate at a second fundamental frequency of said second CW light such that a second power level of the circulated second CW light is greater than the first power level.

3. The inspection system of claim 2, wherein the second fundamental laser comprises one of a Yb doped fiber laser, a Nd doped solid state laser, fiber laser or fiber amplifier, and an erbium (Er) doped solid state laser, fiber laser or fiber amplifier.

4. The inspection system of claim 1, wherein the laser assembly further comprises a pump laser configured to generate second laser light at a first frequency,
wherein the second cavity comprises one of a solid state laser cavity and an optical parametric oscillator cavity, said second cavity being configured to generate the circulated second CW light using the second laser light received from the pump laser such that the circulated second CW light has a second frequency that is lower than the first frequency.

5. The inspection system of claim 4, wherein the frequency mixing module further comprises one of a Nd doped gain medium and an erbium (Er) doped gain medium.

6. The inspection system of claim 4, wherein the second cavity further comprises an optical diode and an etalon.

7. The inspection system of claim 1, wherein the first fundamental CW laser is configured such that the first fundamental frequency has a corresponding wavelength equal to one of approximately 1070 nm, approximately 1064 nm, approximately 1053 nm, approximately 1047 nm, and approximately 1030 nm.

8. The inspection system of claim 1, wherein the first fundamental CW laser comprises one of an ytterbium (Yb) doped fiber laser or fiber amplifier, a neodymium (Nd) doped solid state laser and a Nd doped fiber laser or fiber amplifier.

9. The inspection system of claim 1, wherein the fourth harmonic generation module comprises two frequency doubling cavity modules.

10. The inspection system of claim 1, wherein the fifth harmonic generation module is configured such that the fourth harmonic light and the circulated first fundamental CW light are transmitted collinearly through the first nonlinear crystal.

11. A method of inspecting a sample, the method comprising:
generating continuous wave (CW) laser output light having a wavelength in the range of approximately 181 nm to approximately 185 nm, wherein generating said CW laser output light includes:
generating a first fundamental CW light having a first fundamental frequency with a corresponding first fundamental wavelength between about 1 µm and 1.1 µm;
converting a first portion of the first fundamental CW light to a fourth harmonic light having a fourth harmonic frequency equal to four times the first fundamental frequency;
generating a fifth harmonic light having a fifth harmonic frequency equal to five times the first fundamental frequency by mixing a second portion of the first fundamental CW light and the fourth harmonic light, wherein said mixing comprises circulating said second portion in a first cavity such that said circulated first fundamental CW light passes through a first nonlinear crystal that is also positioned to receive said fourth harmonic light; and
mixing the fifth harmonic light with second CW light having a second frequency with a corresponding wavelength between 1.26 µm and 1.82 µm to generate said CW laser output light, wherein said mixing comprises circulating said second CW light in a second cavity such that said circulated second CW light passes through a second nonlinear crystal that is also positioned to receive said fifth harmonic light;
directing the output laser light onto an article being inspected; and
collecting an image information portion of said laser output light affected by the article being inspected, and directing the image information portion to one or more sensors,
wherein at least one of the first and second nonlinear crystals comprises one of an annealed cesium lithium borate (CLBO) crystal, a hydrogen-treated CLBO crystal and a deuterium-treated CLBO crystal.

12. The method of claim 11, further comprising:
utilizing a second fundamental laser to generate the second CW light as a second fundamental light at a first power level and having a second fundamental frequency; and
directing the second fundamental light from the second fundamental laser into the second cavity such that the second fundamental light is circulated in the second cavity, wherein the second cavity is configured to resonate at the second fundamental frequency such that a second power level of the circulated second fundamental light is greater than the first power level.

13. The method of claim 11, further comprising utilizing a pump laser to generate second laser light at a first frequency,
wherein mixing the fifth harmonic light with second light comprises directing the second laser light into the second cavity, and
wherein the second cavity comprises a solid state laser cavity configured to generate the circulated second CW light using the second laser light received from the pump laser such that the circulated second light has a second frequency that is lower than the first frequency.

14. The method of claim 11, further comprising utilizing a pump laser to generate second laser light at a first frequency,
wherein mixing the fifth harmonic light with second light comprises directing the second laser light into the second cavity, and
wherein the second cavity comprises an optical parametric oscillator cavity configured to generate the circulated light by down-conversion of the second laser light received from the pump laser such that the circulated light has a second frequency that is lower than the first frequency.

15. The method of claim 11, wherein generating said first fundamental CW light comprises generating laser light having a wavelength equal to one of approximately 1070 nm, approximately 1064 nm, approximately 1053 nm, approximately 1047 nm, and approximately 1030 nm.

16. The method of claim 11, wherein generating said first fundamental CW light comprises utilizing one of an ytterbium (Yb) doped fiber laser or fiber amplifier, a neodymium (Nd) doped solid state laser and a Nd doped fiber laser or fiber amplifier.

17. The method of claim 11, wherein converting said first portion of the first fundamental CW light to said fourth harmonic light comprises passing said first portion of the first fundamental CW light through two frequency doubling cavities.

18. The method of claim 11, wherein generating the fifth harmonic light comprises transmitting the fourth harmonic light and the second portion of the first fundamental CW light collinearly through the first nonlinear crystal.

19. The method of claim 11, further comprising generating the second CW light utilizing one of a Yb doped fiber laser, a Nd doped solid state laser, fiber laser or fiber amplifier, and an erbium (Er) doped solid state laser, fiber laser or fiber amplifier.

20. The method of claim 11, wherein mixing the fifth harmonic light with said second CW light comprises directing said circulated second CW light through one of a Nd doped gain medium and erbium (Er) doped gain medium.

* * * * *